United States Patent [19]
Ament

[11] Patent Number: 5,673,778
[45] Date of Patent: Oct. 7, 1997

[54] CLUTCH DISC WITH TORSIONAL VIBRATION DAMPER

[75] Inventor: Norbert Ament, Eltingshausen, Germany

[73] Assignee: Fichtel & Sachs AG, Schweinfurt, Germany

[21] Appl. No.: 566,129

[22] Filed: Dec. 1, 1995

[30] Foreign Application Priority Data

Dec. 2, 1994 [DE] Germany .................. 44 42 868.5

[51] Int. Cl.[6] ............................................. F16D 3/14
[52] U.S. Cl. .................. 192/213.12; 192/70.17; 192/213.31; 464/68
[58] Field of Search ............... 192/213.12, 213.31, 192/214.1, 70.17; 464/64, 68

[56] References Cited

U.S. PATENT DOCUMENTS

| 4,548,310 | 10/1985 | Maucher | 192/213.31 |
|---|---|---|---|
| 4,592,460 | 6/1986 | Kittel | 192/213.31 |
| 5,246,398 | 9/1993 | Birk et al. | 464/63 |
| 5,518,099 | 5/1996 | Murphy | 192/213.12 X |

FOREIGN PATENT DOCUMENTS

| 2322575 | 11/1973 | Germany . |
|---|---|---|
| 3248119 | 6/1984 | Germany . |
| 3400183 | 7/1985 | Germany . |
| 9017106 | 5/1991 | Germany . |
| 2127131 | 4/1984 | United Kingdom . |
| 2165336 | 4/1986 | United Kingdom . |
| 2251052 | 5/1992 | United Kingdom . |
| 8802824 | 4/1988 | WIPO . |

*Primary Examiner*—Andrea L. Pitts
*Attorney, Agent, or Firm*—Nils H. Ljungman and Associates

[57] ABSTRACT

This invention relates to a clutch disc with a torsional vibration damper, in which a control plate is used which, after a specified angle of rotation, comes into contact with the aperture of a spring element. Additional friction surfaces can be activated as a result of the presence of a control plate, which is capable of coming into contact on one of the components, i.e. the input part or the output part, with a friction element which is connected non-rotationally to the other of the two components.

20 Claims, 7 Drawing Sheets

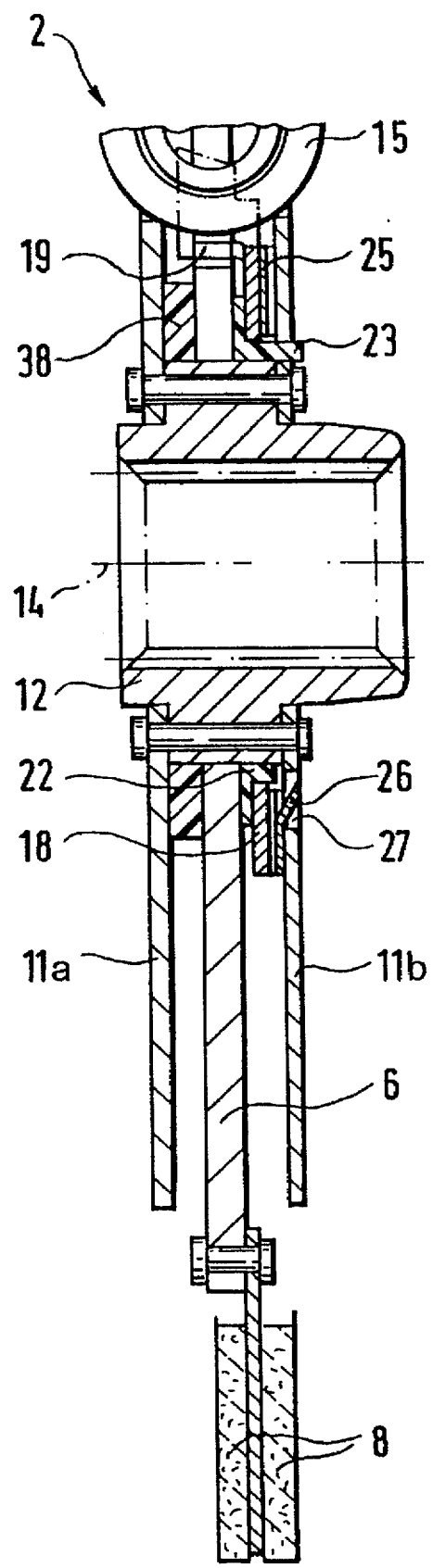

CLUTCH DISC WITH TORSIONAL VIBRATION DAMPER

BACKGROUND OF THE INVENTION

1. Field of the Invention

This invention generally relates to a friction clutch with a clutch disc comprising at least one essentially disc-shaped input part with friction linings in its radially outer area, and at least one essentially disc-shaped output part which has a hub in its radially inner area with internal gear teeth, by means of which it can be placed on a transmission shaft. The input part and the output part overlap axially over a portion of their radial length, and in this area apertures are provided for the location of spring elements. The spring elements can provide a mutual spring-assisted rotation when torque is applied, and in the area of the axial overlap there is also a friction device which has a friction-generating spring device and a control plate with the friction surfaces.

2. Background Information

An embodiment of a friction clutch with a control plate is described in German Utility Model 90 17 106. In such a friction clutch, the control plate interacts with a spring which spring, as in the present case, is inserted circumferentially in appropriately sized apertures of the lining carrier and cover plate, and whereby the corresponding aperture in the hub disc is significantly larger in the circumferential direction. In this manner, when torque is applied, it is possible to connect the control plate inside the frame of the larger aperture in the hub disc with the cover plate, effectively as one piece, so that a friction force is generated in this area only be the friction ring which is located between the control plate and the hub disc. After exhausting the clearance between the tabs of the control plate and the spring on one hand, and the enlarged aperture in the hub disc, the corresponding tabs come into contact on the edge of the aperture, and when further torque is applied, a relative movement takes place between the cover plate and the control plate. As a result of the use of materials which have different coefficients of friction, and also, for example, the use of different friction radii, it thereby becomes possible to generate friction forces which differ as a function of the angle of rotation. The friction force will generally have a higher value as the angle of rotation increases.

OBJECT OF THE INVENTION

The object of this invention, proceeding from known friction clutches, is to employ the simplest possible means to realize a broader spectrum of friction forces.

SUMMARY OF THE INVENTION

The present invention teaches that this object can be accomplished by means of a friction device including at least one friction element and a control plate, wherein the control plate forms a common friction surface with the friction element. The friction element is connected non-rotationally, but so that it can move axially, with one of the two parts, i.e. the input part or the output part, and is simultaneously in frictional contact with the other of the two parts, i.e. the input part or the output part, by means of a friction surface. As a result of this construction it is possible, during the transition from the one friction stage to the other, to also activate two friction surfaces, which means that there can be an improved ability to tune the friction device to the specific conditions in the motor vehicle. In contrast to known friction devices, specifically during the transition from the one friction state to the other, the one friction stage is not deactuated, but remains active, and as a result of the contact with the control plate, both its sides can be used to generate the friction force.

With reference to an additional characterizing feature, the invention teaches that it can be advantageous that the friction element is non-rotationally connected to the input part and is in contact with the output part, and that the control plate is located between the friction element and the input part. Such a simple construction is advantageously used in clutch discs on which the friction linings are fastened to a lining carrier which is connected at some distance with a cover plate, and whereby the hub runs between the two hub discs.

With reference to another embodiment, the invention teaches that the friction element can be non-rotationally connected to the output part, is in contact with the input part, and the control plate is located between the friction element and the output part. Such an embodiment can be used in particular with a clutch disc on which two cover plates are fastened to the hub at some distance from one another in the axial direction, and where the hub disc functions as an input part and carries the friction linings.

The invention further teaches that the spring device which generates the friction force has a spring element which can be realized in the form of a zig-zag spring or plate spring, and is preferably located between the control plate and the input part or output part. This teaching can make it possible to achieve space-saving arrangement.

An additional teaching of the invention is that the spring element can simultaneously function as a friction element, and can be connected, preferably non-rotatably, with the input part, the output part, or the control plate. In particular when the spring element is non-rotationally connected to the control plate, it is also conceivable that the two parts can be combined into a single assembly. However, it is theoretically possible to provide the spring element without a non-rotational connection, although in that case it must be taken into consideration that it can thereby become essentially impossible to correctly fix or define the position of the friction surface.

The invention also teaches that the spring element can be realized in the form of an encircling ring with lugs which run diagonally inward or outward, and which are engaged in corresponding openings. Such a realization of the spring element can be particularly simple.

In a realization in which the spring element is non-rotationally connected to the input part or the output part, the invention teaches that the friction element is realized in the form of a friction ring which has recesses on the radial inside, in which recesses lugs can be engaged. These lugs can extend axially toward the friction element and can be provided on the input part or the output part. Such a realization is especially advantageous, in particular with regard to the strength and durability of the individual parts, since the rotational drive between the input part or the output part and the friction element is transmitted by means of lugs which run essentially axially, and which lugs are provided on the input part or output part and thus are made of metal.

In a realization in which the spring element is non-rotationally connected to the input part or the output part, the invention teaches that the friction element can be realized in the form of a friction ring with axially projecting lugs, which lugs are attached on the radial inside and which lugs are engaged circumferentially essentially without clearance or play in corresponding openings of the input part or of the output part. The spring element can surround at least one of the lugs on both sides to make possible a mutual drive essentially without clearance or play. Such a realization can also facilitate the pre-assembly process, for example. In terms of manufacturing tolerances, the lack of clearance is thereby to be understood to mean that the least possible clearance is desirable.

The invention also teaches that the hub disc can be designed as an output part and can be non-rotationally connected by means of gear teeth on the hub with at least some clearance or play in the circumferential direction. The friction element, which friction element is non-rotationally connected to the cover plate, as well as the control plate and the spring element, are located between the hub disc and the one cover plate which function as an input part. On the side of the hub disc opposite the friction element there can be an idle damper with a hub disc, which hub disc is non-detachably connected to the hub and a cover plate located on the side of the hub disc of the load damper which is farther from the hub disc. There can also be springs located in apertures of the cover plate and hub disc. In this construction the idle damper system is located on the one side of the hub disc for the load damper, and the friction device with the friction element and the control plate are located on the other side. This construction has, in an extremely narrow space, both an idle damper and a load damper, whereby the latter can have a wider range within which it can be tuned with regard to the stages and graduation of the friction force.

The invention also teaches that the cover plate is in non-rotational contact with axially bent lugs on the hub disc and is axially supported against the hub disc, and between the cover plate and the other cover plate there is a friction ring and possibly an additional control plate. In this manner, the cover plate of the idle damper can be used to create an additional friction surface opposite the cover plate of the load damper and, when an additional cover plate is used, to achieve an additional graduation of the friction force.

The additional control plate is thereby non-rotationally connected to the first control plate, possibly by means of lugs. The lugs in question can preferably extend axially, can be manufactured in one piece with the control plate, extend through the hub disc with some clearance, and can be engaged essentially without clearance in openings in the control plate. The control plate is essentially directly in contact with the cover plate, and the friction ring is located between the control plate and the cover plate. Such a construction can make it possible to realize larger jumps or skips in the friction forces which can be generated, when and if necessary.

On clutch discs without a separate idle damper, the invention teaches that a second control plate can be provided which is non-rotationally connected to the first control plate, and on which the hub disc is located, on the side opposite the first control plate. In this manner, the opposite side can also be used to achieve a jump in the friction force.

The additional control plate thereby has a friction ring or a coating opposite the hub disc, and there is metal-to-metal contact with the cover plate. In each case, the high friction between the additional control plate and the cover plate is provided so that the cover plate generates a high friction force after it comes to a standstill with respect to the hub disc.

The friction element advantageously has an L-shaped cross section with an axially-inward leg which runs axially, from which leg the lugs extend. The friction element, although small, can thereby be given a high degree of rigidity.

The friction element is preferably made of plastic, which means that the manufacturing costs can be kept very low.

To achieve a precise gradation of the friction forces, it may be advantageous to realize different coefficients of friction on its two friction surfaces. That can be achieved, for example, by applying partial coatings of materials which have different coefficients of friction.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the present invention resides broadly in a friction clutch for a transmission, in particular a transmission for a motor vehicle, the friction clutch comprising a clutch disc, the clutch disc comprising: hub means; the hub means comprising a hub disc and a hub; the hub defining an axis of rotation; the hub disc being disposed concentrically about the hub; the hub disc comprising a first side and a second side; a first cover plate disposed at the first side of the hub disc; the first cover plate comprising: a plurality of windows disposed within the first cover plate; a second cover plate disposed at the second side of the hub disc, the second cover plate comprising: a plurality of windows disposed within the second cover plate; the hub being configured to be torsionally locked on a drive shaft; the hub disc comprising: a plurality of windows disposed within the hub disc; ones of the plurality of windows of the first cover plate, the second cover plate, and the hub disc being aligned with one another; a plurality of spring actuators disposed within the ones of the plurality of windows of the first cover plate, the second cover plate, and said hub disc; friction linings; the friction linings being disposed on one of the first cover plate and the second cover plate; a friction device comprising: a first body, the first body comprising a friction body, the friction body being annular; the annular friction body comprising means for rotating the annular friction body with one of the hub means and the first cover plate; the friction body comprising means for permitting axial movement of the friction body substantially parallel to the axis of rotation with respect to the hub means; a second body, said second body comprising an annular plate; the annular plate being disposed at least partially between the first cover plate and the friction body; the annular plate being disposed in frictional contact with the friction body; and the friction body being disposed at least partially between the hub means and the annular plate.

Another aspect of the invention resides broadly in a friction clutch with clutch disc, comprising at least one essentially disc-shaped input part with friction linings in its radially outer area, at least one essentially disc-shaped output part which has a hub in its radially inner area with internal gear teeth so that it can be placed on a transmission shaft which defines an axis of rotation, whereby the two overlap axially over a portion of their radial extent, and in this area apertures are provided for the location of spring elements for their mutual spring-assisted rotation when torque is applied, and in the area of the axial overlap there is also a friction device which has a friction-generating spring device and a control plate with friction surfaces, characterized by the fact that the friction device consists of at least one friction element and the control plate, and the control plate forms a common friction surface with the friction element, whereby the friction element is connected non-rotationally but so that it can move axially with one of the two parts, i.e. the input part or the output part, and is simultaneously in frictional contact by means of a friction surface with the other of the two parts, i.e. the input part or the output part.

BRIEF DESCRIPTION OF THE DRAWINGS

The present invention is explained in greater detail below with reference to the embodiments illustrated in the accompanying figures, in which:

FIG. 2a is essentially the same as FIG. 2, but shows additional components;

DESCRIPTION OF THE PREFERRED EMBODIMENT

Figure 1:
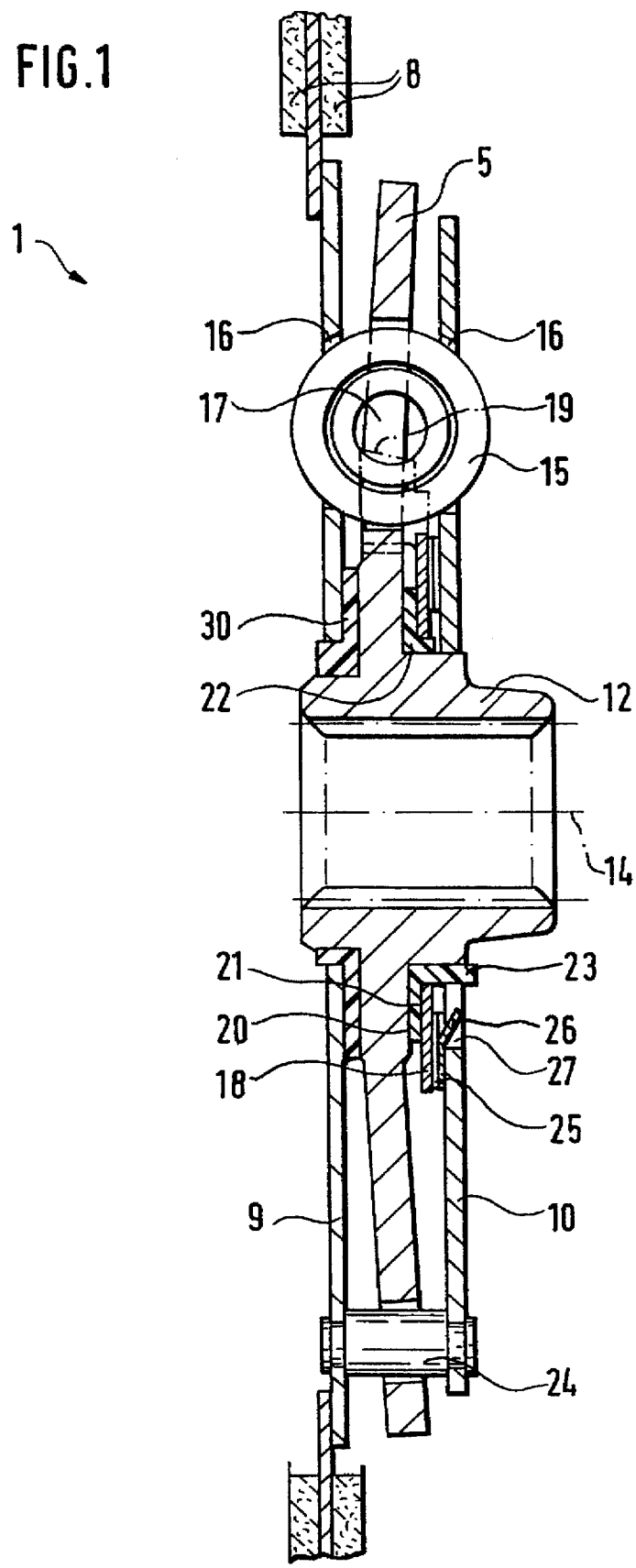
FIG. 1 shows a section through a clutch disc in which the input parts are realized in the form of lining carrier and cover plate.

The clutch disc 1 illustrated in FIG. 1 shows a hub 12 with internal gear teeth, which hub 12 can be attached to a transmission shaft (not shown). These two parts define an axis of rotation 14. Located on the hub 12 can be a hub disc 5 which preferably points radially outward, which can either be realized in one piece with the hub 12 or can also be manufactured separately, and can be preferably non-rotationally connected to the hub 12 by means of gear teeth. On the two sides of the hub disc 5 there preferably are cover plates 9 and 10 respectively, which are permanently connected to one another and are held at a distance from one another by means of spacer rivets 24. The friction linings 8 are preferably fastened in the radially outer area of the cover plate 9. There are preferably spring elements 15, e.g. coil springs, in apertures 16 of the cover plates 9 and 10 and in apertures 17 of the hub disc 5. When torque is applied between the friction linings 8 and the hub 12, these spring elements 15 preferably are compressed, and there is preferably a spring-assisted rotation between the cover plates 9 and 10 on one hand and the hub 12 and the hub disc 5 respectively on the other hand. During this spring-assisted rotational movement, various friction forces must be overcome which are used to damp torsional vibrations. This task is performed by, among other things, the bearing ring 30 which is preferably located on the inside diameter of the cover plate 9 and which is preferably used to guide all the parts which can rotate with respect to the hub 12. On the side of the hub disc 5 opposite this bearing ring 30, a friction device can be provided which preferably consists of a friction ring 22 which preferably has an approximately L-shaped cross section. The friction ring 22 is preferably in contact by means of its leg which runs radially against the hub disc 5, and lugs 23 extend from its axially-extending leg which are engaged in corresponding openings 27 in the cover plate 10, thereby preferably creating a non-rotational but axially-mobile connection between the parts 10 and 22. Between the radial leg of the friction element 22 and the inside of the cover plate 10, there can be a control plate 18 and a spring element 25. The control plate 18, which is preferably in direct contact with the radial leg of the friction element 22, is engaged in its radially outer area with lugs 19 which run essentially axially in an aperture 17 of the hub disc 5, whereby the lugs 19 are in contact against the circumferential end surfaces of the spring element 15, which interact with the lugs 19, [and] are larger in the circumferential direction than the spring elements 15. In this case, the spring element 25 is preferably non-rotationally connected to the cover plate 10, namely by means of lugs 26 which are preferably engaged without play in the circumferential direction in the openings 27 of the cover plate 10. The friction element 22, in the vicinity of its leg which extends radially, can have a friction surface 20 opposite the hub disc 5, and a friction surface 21 opposite the control plate 18.

The clutch disc 1 can preferably function as follows:

The spring element 25 is preferably installed with axial bias, and essentially guarantees that the components 18, 22 and 30 located between the hub disc 5 and the cover plates 9 and 10 can be held under axial bias. This axial bias is preferably absorbed by the spacer rivets 24. When torque is applied to the clutch disc 1 and there is preferably relative rotation between the two cover plates 9 and 10, and the hub disc 5 in a first area, in which the spring elements 15 which interact with the lugs 19 of the control plate 18 have not yet come in contact with the apertures 17 which have a larger circumference, the following elements participate in the generation of the friction force:

The bearing ring 30—which is preferably non-rotationally connected to the cover plate 9—rubs against the hub disc 5; the friction element 22—which is preferably non-rotationally connected to the cover plate 10—rubs by means of its friction surface 20 against the hub disc 5; in this operating state, the control plate 18 and the spring element 25 are preferably non-rotationally connected to the cover plate 10 and thus essentially generate no friction force. When, as the rotation increases, preferably the lugs 19 of the control plate 18 can come into contact with the circumferential boundary edges of the apertures 17, the control plate 18 can be held in place on the hub disc 5, while the two cover plates 9 and 10 and the friction element 22 preferably execute an additional rotational movement. In this operating state, therefore, an additional friction force essentially must be overcome, which can be generated both at the friction surface 21 between the control plate 18 and the friction element 22, and between the control plate 18 and the spring element 25. Depending on the realization of these additional friction surfaces with regard to their coefficients of friction, it is also possible to realize large jumps in friction forces. Naturally, both the friction element 22 and the control plate 18 can be provided with special coatings to generate appropriate friction forces. It is also possible to connect the spring element 25 non-rotationally with the control plate 18, in which case the friction surface opposite the cover plate 10 becomes active. It is also possible to realize the spring element 25 so that it is preferably non-rotationally connected to the friction element 22, by having the spring element 25 surround at least one of the axial lugs 23 of the friction element 22 from both sides without clearance. As a result of the construction described above, in spite of the use of a single spring element 25, it could be possible to employ additional friction surfaces which are a function of the angle of rotation, which means that significant increase in friction can be achieved. It is also possible to have a non-rotational connection of the friction element 22 on the hub disc 5, but that requires that the lugs 19 of the control plate 18 be engaged in the apertures 16, and the apertures 16 must be larger in their circumferential length than the spring elements 15.

Concerning the spring element 25, the spring element 25, in other words provides bias on the control plate 18 to, in turn, bias the control plate 18 against the common friction surface 21, which common friction surface 21 is formed by the friction element 22 and control plate 18. The side of spring element 25, axially opposite the control plate 18, makes contact with the cover plate 10.

Figure 2:
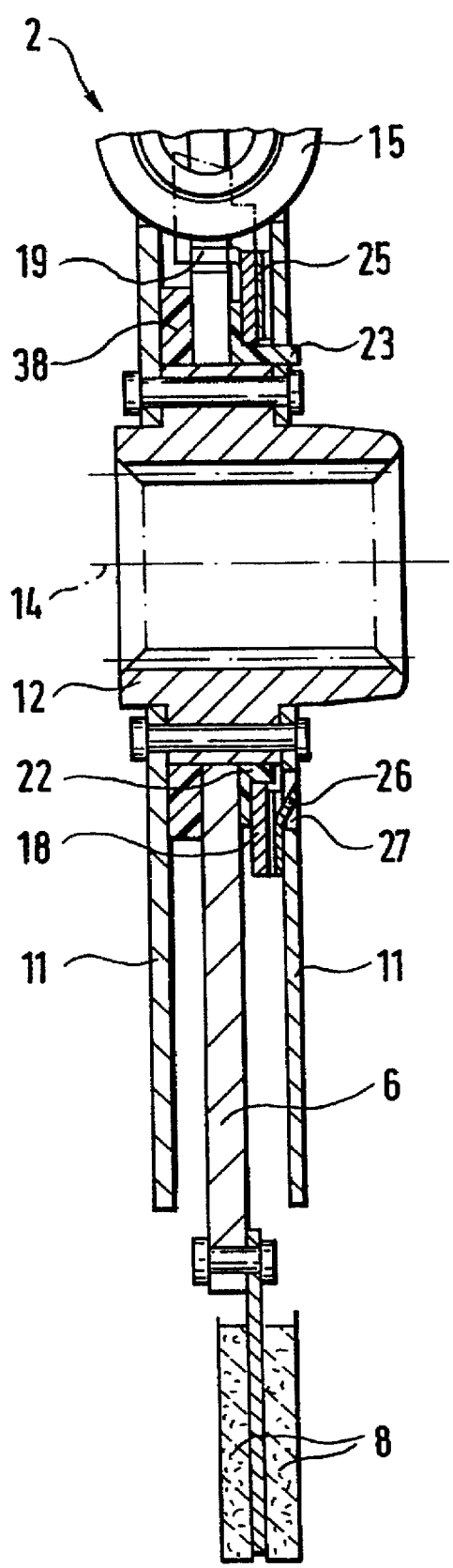
FIG. 2 shows a partial section through a clutch disc, in which the lateral discs are non-detachably connected to the hub and function as output parts.

FIG. 2 shows a clutch disc 2 which, in terms of its basic structure, is a reversal of FIG. 1. "Reversal" in this case means that the friction linings 8 are fastened to the centrally located hub disc 6, and the disc, as the input part, can be rotated with respect to the hub 12, while the two side discs 11 are permanently connected to the hub 12 and correspond to the output parts. The further construction of this clutch disc 2 is such that between the one side disc 11 and the hub disc 6, there is a friction ring 38, while on the opposite side, between the side disc 11 and the hub disc 6, there is a friction element 22, a control plate 18 and a spring element 25. The friction element 22 is in direct contact by means of its radially-running leg against the hub disc 6, and its axially-running leg has lugs 23 extending from it which are non-rotationally engaged in corresponding openings in the side disc 11. In this case, the spring element 25 is also non-rotationally connected to the side disc 11, namely by means of lugs 26 which are engaged circumferentially without play in corresponding openings 27. The control plate 18 is provided with tabs or lugs 19 which are engaged in corresponding apertures of the hub disc 6, whereby the tabs 19 interact with corresponding spring elements 15, and the two elements 15 and 19 are located in apertures of the hub disc 6 which have a larger circumference.

In terms of function, there is essentially no difference from the embodiment illustrated in FIG. 1. In this construction, it is also theoretically possible to connect the friction element 22 non-rotationally to the hub disc 6, in which case the tabs or lugs 19 of the control plate 18 essentially must engage in apertures of the side disc 11 which are circumferentially larger.

FIG. 2a also shows a clutch disc 2 and is analogous to FIG. 2. The two side discs 11a and 11b are essentially permanently connected to the hub 12. The further construction of this clutch disc 2 is preferably such that between the side disc 11a and the hub disc 6, there is preferably a friction ring 38, while on the opposite side, between the other side disc 11b and the hub disc 6, there is preferably a friction element 22, a control plate 18 and a spring element 25. The friction element 22 can preferably be in direct contact with the hub disc 6 by means of its radially-extending leg which extends along the hub disc 6. The axially-extending leg of the friction element 22 can preferably have lugs 23 extending from it which are preferably non-rotationally engaged in corresponding openings in the side disc 11b. In this case, the spring element 25 is also preferably non-rotationally connected to the side disc 11b, namely by means of lugs 26 which can preferably be engaged circumferentially essentially without play in corresponding openings 27 of disc 11b. The control plate 18 can be provided with tabs or lugs 19 which can preferably be engaged in corresponding apertures of the hub disc 6, whereby the tabs 19 can interact with corresponding spring elements 15, and the two elements 15 and 19 can be located in apertures of the hub disc 6, which apertures can have a larger circumference than the spring elements 15.

In terms of function, there is essentially no difference from the embodiment illustrated in FIG. 1. In this construction, it is also theoretically possible to connect the friction element 22 non-rotationally to the hub disc 6, in which case the tabs or lugs 19 of the control plate 18 preferably engage in apertures of the side disc 11b which are circumferentially larger.

It may be noted that if the axis of rotation 14 in FIG. 2a were to be considered a line of division of FIG. 2a, then FIG. 2a can be viewed as two separate embodiments, and the two embodiments can operate similarly.

FIG. 2a can be considered one embodiment with the upper cross section drawn at one angle with respect to the longitudinal axis of FIG. 2a. The lower portion of FIG. 2a in this embodiment can be drawn at another angle with respect to the same longitudinal axis.

FIG. 2a may also be considered one embodiment with the cross section being drawn along the longitudinal axis.

Figure 3:
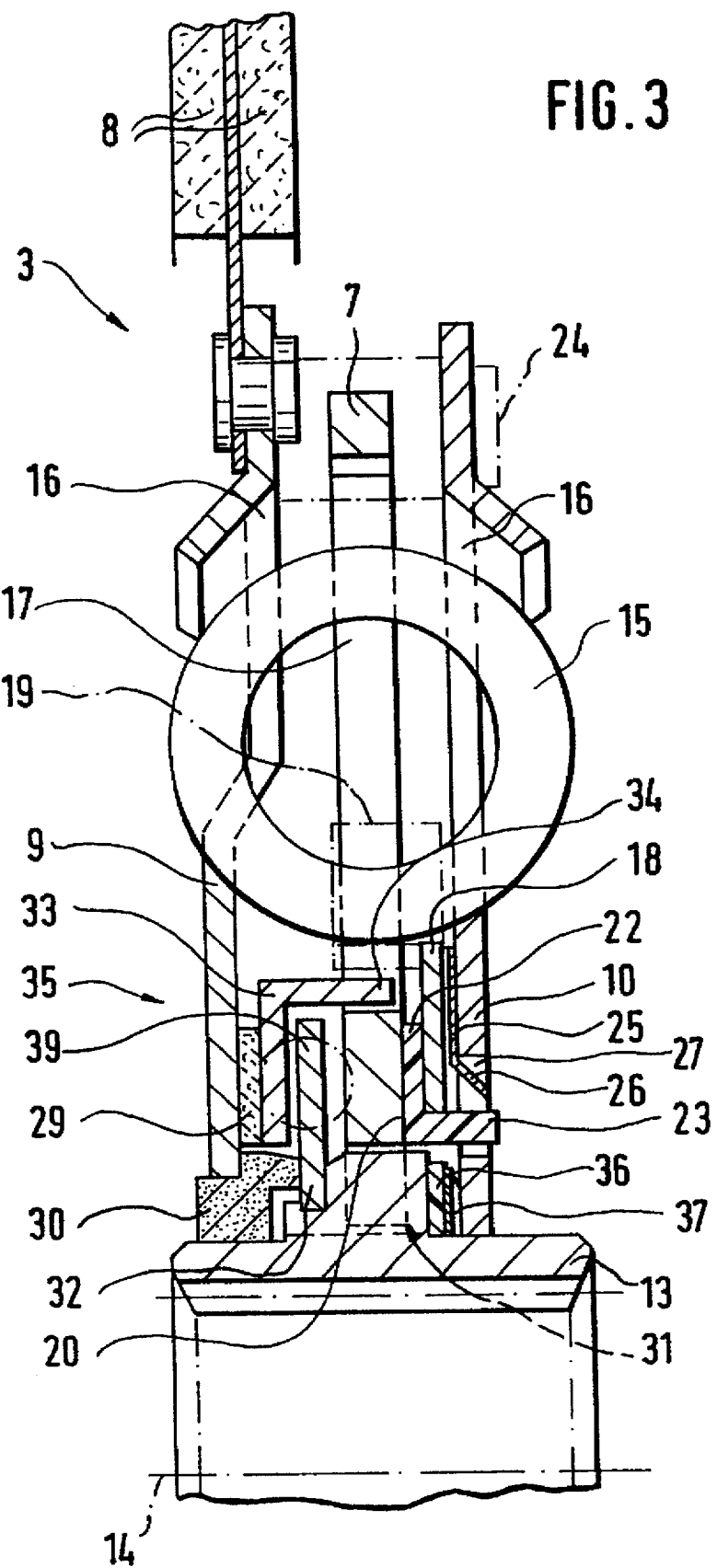
FIG. 3 shows a partial section through a clutch disc with an idle damper.

FIG. 3 illustrates the application of the teaching of the invention to a clutch disc 3 on which there can be an idle damper 35. The clutch disc 3 preferably has a hub 13 which can have internal gear teeth and define an axis of rotation 14. The hub disc 7 can be manufactured separately from the hub 13 and the two parts are preferably non-rotationally connected to one another by means of gear teeth 31, taking into consideration a rotational clearance which defines the range of operation of the idle damper 35. On both sides of the hub disc 7 there are cover plates 9 and 10 which are preferably non-rotationally connected to one another and can be held at a distance from one another by means of spacer rivets 24. One of these cover plates 9 and 10 can be provided with friction linings 8. In apertures 16 of the cover plates 9 and 10, and in apertures 17 of the hub disc 7, there can be spring elements 15 which are preferably compressed when torque is applied. Immediately radially inside the spring elements 15 there can preferably be a friction device for the load range or area which may consist of a friction element 22 which can preferably be non-rotationally connected by means of lugs 23 to the cover plate 10, and of a control plate 18 which is preferably located between the cover plate 10 and the friction element 22, and which is provided with tabs located on the radial outside which run axially. Furthermore, between the control plate 18 and the cover plate 10 there can be a spring element 25, which is preferably braced against the inside of the cover plate 10. The lugs 19 of the control plate 18 can extend in the axial direction into apertures 17 of the hub disc 7, which are preferably larger in the circumferential direction than the length of the spring elements 15, and they are in contact with the end surfaces of the spring elements 15 (when a load is not being applied to the spring elements 15). In this case, the spring element 25 is preferably non-rotationally connected to the cover plate 10, and namely by means of lugs 26 which can be engaged in corresponding openings 27. On the side of the hub disc 7 opposite this friction device, there can be an idle damper 35. The idle damper 35 preferably consists of a hub disc 32 which is preferably non-detachably fastened to the hub 13. There can also be a cover plate 33 which can be located on the side of the hub disc 32 farther from the hub disc 7, and is preferably non-rotationally connected to the hub disc 7 by means of lugs 34 which run axially, and preferably is also axially supported against the hub disc 7. There can be a friction ring 29 between the cover plate 33 and the cover plate 9. But it is also possible to have a metal-on-metal friction surface here. In apertures of the hub disc 32 and in apertures of the cover plate 33, and in depressions of the hub disc 7, there can be spring elements 41 for the idle damper 35. Furthermore, in a radially inner area of the cover plate 9, there is preferably a bearing ring 30 which can provide guidance for the cover plates 9 and 10 with respect to the hub 13. This bearing ring 30 is preferably simultaneously in contact with the outside of the cover plate 32 and acts as an axial stop. On the opposite side of the bearing ring 30, in the gear tooth area 31, axially outside the hub disc 7 between the gear teeth 31 and the cover plate 10, there can be a friction ring 36 and a friction spring 37. These components 30, 36 and 37 can generate a basic friction which is preferably effective over the entire angle of rotation of the clutch disc 3. The parts 36 and 37 are thereby located radially inside the friction element 22.

The clutch disc can preferably function as follows:

When a low torque is applied to the friction lining 8, and as long as there is still clearance between the gear teeth 31, essentially only the spring force of the spring elements 41 is active, along with the friction force of the components 30, 36 and 37. When greater torques are applied, and then, as the clearance between the gear teeth 31 is closed, the hub disc 7 remains non-rotationally connected to the hub 13 with respect to the rotational movement of the cover plates 9 and 10. In this area it is essentially no longer the spring elements 41 which are active, but the friction force of the elements 30, 36 and 37. In addition, the low range of the load friction is actuated, such that a relative motion takes place between the cover plate 9 and the cover plate 33 on the one hand, and between the cover plate 10 and the hub disc 7 on the other hand. In this first state of the load friction device, the control plate 18 moves conformally with the cover plate 10 and the friction element 22. Consequently, a friction force occurs only on the friction surface 20, and between the cover plate 9 and the cover plate 33. As the angle of rotation increases, the lugs 19 of the control plate 18 come into contact with the circumferential boundary edges of the apertures 17 of the hub disc 7, which results in a jump in the friction force to higher levels. As a result of this contact of the lugs 19, there is then a relative movement between the cover plate 10 and the friction element 22 on one hand, and the hub plate 7 and the control plate 18 on the other hand. In addition to the friction surfaces indicated above, there is also a friction surface 21 between the control plate 18 and the friction element 22 which becomes active, as does the friction surface between the spring element 25 and the control plate 18. Since the control plate 18 and the spring element 25 are conventionally made of metal, a high friction force is generated between the two surfaces. The friction force on the friction surface 21 can be set as desired, e.g. by applying an appropriate coating to the friction element 22 or to the control plate 18. Preferably, the friction element 22 is made of plastic, and the coefficient of friction on the friction surface 20 is kept relatively low. The friction surface effective between the cover plate 33 and the cover plate 9 can also be varied within a wide range in terms of its coefficient of friction.

This construction can make possible a significantly wider variation of the friction force, as a function of the angle of rotation, and without additional components, than does the friction clutch of the prior art, so that the basic structure can be retained, even if the clutch disc is used in different motor vehicles.

Figure 3A:
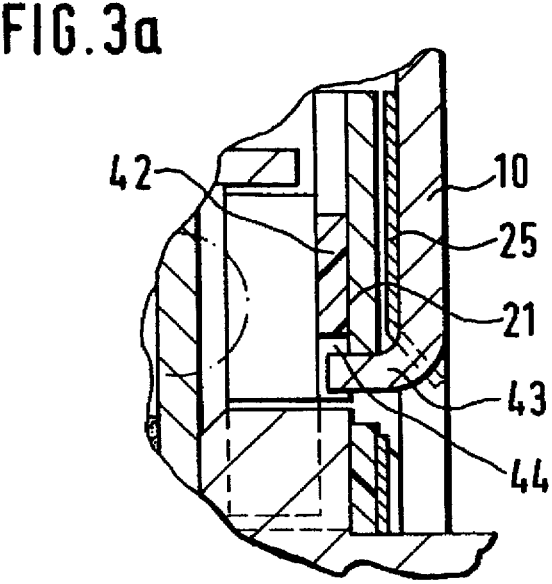
FIGS. 3a, b and c show a partial section through a clutch disc and various embodiments of a friction element.
Figure 3B:
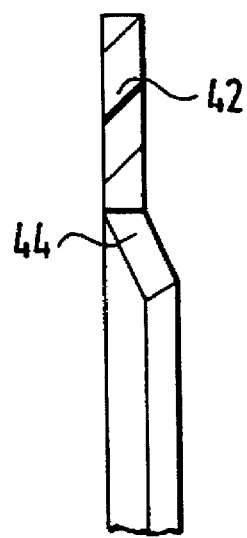
FIG. 3d is essentially the same as FIG. 3, but shows additional components.
Figure 3C:
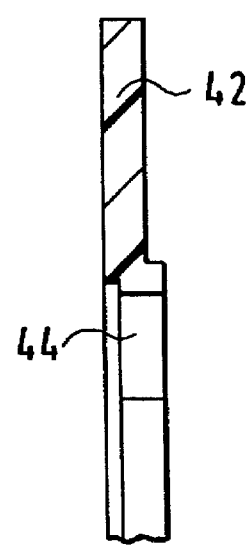

FIG. 3a shows a modified detail of the embodiment illustrated in FIG. 3. In this case, the non-rotational connection between the cover plate 10 as the input part and the friction element—here labeled 42—is preferably made by means of one or more lugs 43 located on the cover plate 10 which run essentially axially toward the friction element 42, and which can be engaged essentially without clearance in corresponding recesses 44. Such a non-rotational connection can preferably absorb a high load, since on one hand there can be a multiplicity of lugs 43 distributed around the circumference, and on the other hand these lugs 43 can be bent out of the metal of the cover plate 10. FIGS. 3b and 3c illustrate variants of the friction element 42, whereby in both cases, the area with the recesses 44 is preferably displaced out of the plane of the friction element 42 toward the cover plate 10, namely to essentially achieve a 100% overlap with the lugs 43, thereby reducing the surface pressure. This measure can be advantageous, since the end surfaces of the lugs 43, which must be realized so that they face toward the hub disc 7, must be manufactured with larger tolerances under some conditions, and also because the relative position between the hub disc 7 and the cover plate 10 is also a function of the war of the friction rings 29 and 42 respectively.

Figure 3D:
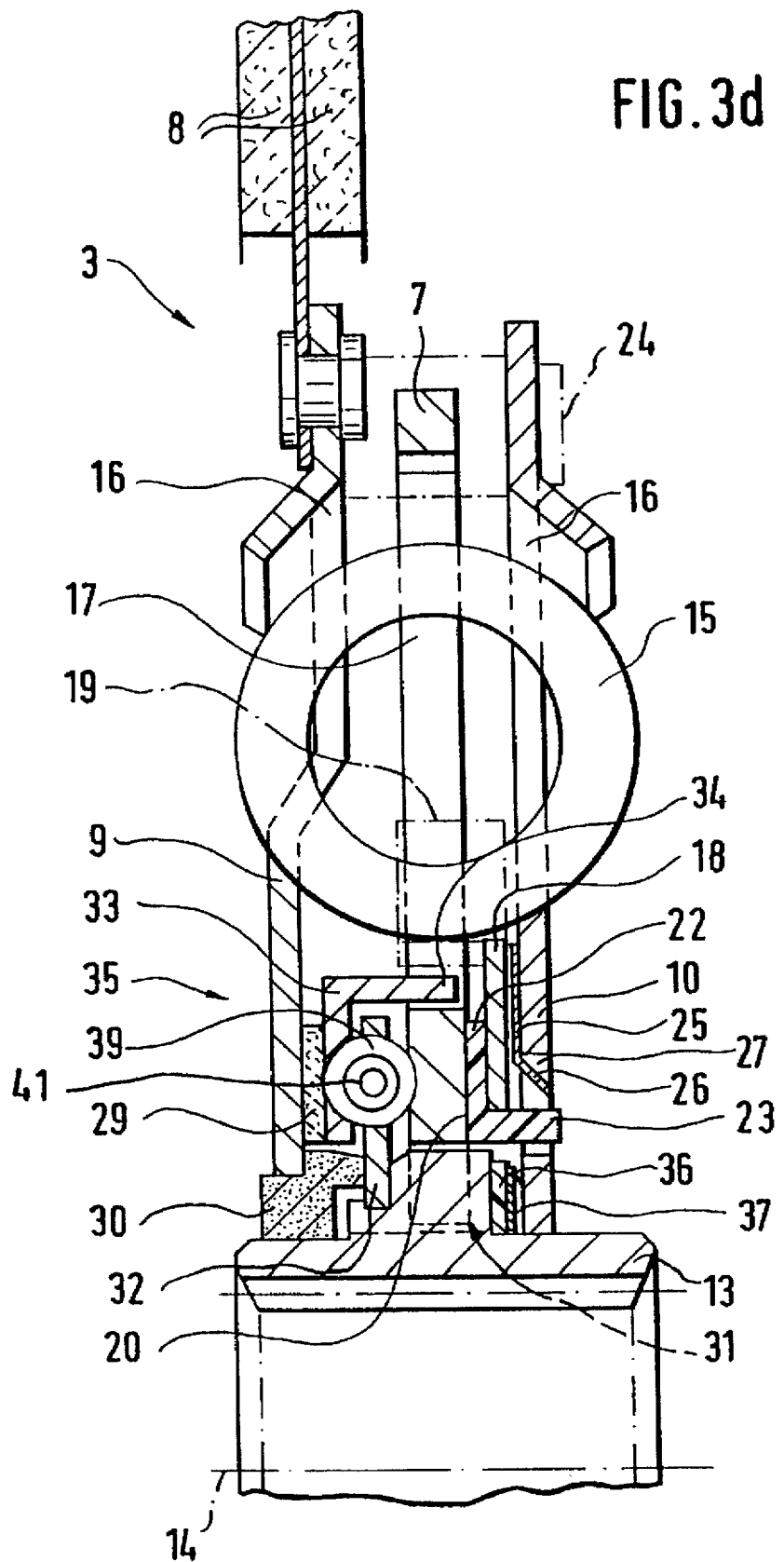

FIG. 3d is essentially the same as FIG. 3, and may be considered an embodiment of the present invention. FIG. 3d illustrates the application of the teaching of the invention to a clutch disc 3 on which there can be an idle damper 35. The clutch disc 3 preferably has a hub 13, which hub 13 can have internal gear teeth and can define an axis of rotation 14. The hub 13 can also have a hub disc 7, which hub disc 7 can be manufactured separately from the hub 13. The two parts are preferably non-rotationally connected to one another by means of gear teeth 31, taking into consideration a rotational clearance which defines the range of operation of the idle damper. On both sides of the hub disc 7 there are cover plates 9 and 10 which are preferably non-rotationally connected to one another and can be held at a distance from one another by means of spacer rivets 24. One of these cover plates 9 or 10 can be provided with friction linings 8. In apertures 16 of the cover plates 9 and 10, and in apertures 17 of the hub disc 7, there can be spring elements 15 which are preferably compressed when torque is applied. Immediately radially inside the spring elements 15 there can preferably be a friction device for the load range or area, which friction device may include a friction element 22 non-rotationally connected, by means of lugs 23, to the cover plate 10, and a control plate 18 located between the cover plate 10 and the friction element 22. The control plate 18 can be provided with tabs or lugs 19 located on the radial outside, which tabs or lugs 19 extend axially.

Furthermore, between the control plate 18 and the cover plate 10 there can be a spring element 25, which spring element 25 is preferably braced against the inside of the cover plate 10. The lugs 19 of the control plate 18 can extend in the axial direction into the apertures 17 of the hub disc 7, which apertures 17 are preferably larger in the circumferential direction than the length of the spring elements 15, and which apertures 17 can be in contact with the end surfaces of the spring element 15 (when a load is not being applied to the spring elements 15). In this case, the spring element 25 is preferably non-rotationally connected to the cover plate 10 by means of lugs 26, which lugs 26 can be engaged in corresponding openings 27 of cover plate 10.

On the side of the hub disc 7 opposite this friction device, there can be an idle damper 35. The idle damper 35 preferably include a hub disc 32 which is preferably non-detachably fastened to the hub 13. There can also be a cover plate 33 which can be located on the side of the hub disc 32 farther from the hub disc 7. The cover plate 33 can preferably be non-rotationally connected to the hub disc 7 by means of lugs 34 which extend axially. Cover plate 33 can preferably also be axially supported against the hub disc 7. There can be a friction ring 29 between the cover plate 33 and the cover plate 9. However, it can also be possible to have a metal-on-metal friction surface here.

In apertures of the hub disc 32 and in apertures of the cover plate 33, and in depressions of the hub disc 7, all of which cannot be seen in the view shown in FIG. 3, there can be spring elements 41 for the idle damper. Furthermore, in the radially inner area of the cover plate 9, there is preferably a bearing ring 30 which can provide guidance for the cover plates 9 and 10 with respect to the hub 13. This bearing ring 30 is preferably simultaneously in contact with the outside of the cover plate 32 and acts as an axial stop. On the opposite side of the bearing ring 30, in the gear tooth area 31, axially outside the hub disc 7 between the gear teeth 31 and the cover plate 10, there can be a friction ring 36 and a friction spring 37. These components 30, 36 and 37 can generate a basic friction which is preferably effective over the entire angle of rotation of the clutch disc 3. The parts 36 and 37 are thereby located radially inside the friction element 22.

The bearing ring 30, which can provide guidance for the cover plates 9 and 10 with respect to the hub 13 can preferably be in contact with the axial outside of the radial inside of the cover plate 32.

The clutch disc can preferably function as follows:

When a low torque is applied to the friction lining 8, and as long as there is still clearance between the gear teeth 31, essentially only the spring force of the spring elements 41 is active, along with the friction force of the components 30, 36 and 37. When greater torques are applied, and then, as the clearance between the gear teeth 31 is closed, the hub disc 7 remains non-rotationally connected to the hub 13 with respect to the rotational movement of the cover plates 9 and 10. In this area it is essentially no longer the spring elements 41 which are active, but the friction force of the elements 30, 36 and 37. In addition, the low range of the load friction is actuated, such that a relative motion takes place between the cover plate 9 and the cover plate 33 on the one hand, and between the cover plate 10 and the hub disc 7 on the other hand. In this first stage of the load friction device, the control plate 18 moves conformally with the cover plate 10 and the friction element 22. Consequently, a friction force occurs only on the friction surface 20, and between the cover plate 9 and the cover plate 33. As the angle of rotation increases, the lugs 19 of the control plate 18 come into contact with the circumferential boundary edges of the apertures 17 of the hub disc 7, which results in a jump in the friction force to higher levels. As a result of this contact of the lugs 19, there is then a relative movement between the cover plate 10 and the friction element 22 on one hand, and the hub plate 7 and the control plate 18 on the other hand. In addition to the friction surfaces indicated above, there is also a friction surface 21 between the control plate 18 and the friction element 22 which becomes active, as does the friction surface between the spring element 25 and the control plate 18. Since the control plate 18 and the spring element 25 are conventionally made of metal, a high friction force is generated between the two surfaces. The friction force on the friction surface 21 can be set as desired, e.g. by applying an appropriate coating to the friction element 22 or to the control plate 18. Preferably, the friction element 22 is made of plastic, and the coefficient of friction on the friction surface 20 can be kept relatively low. The friction surface effective between the cover plate 33 and the cover plate 9 can also be varied within a wide range in terms of its coefficient of friction.

The construction can make possible a significantly wider variation of the friction force, as a function of the angle of rotation, and without additional components, than do known friction clutches, so that the basic structure can be retained, even if the clutch disc is used in different motor vehicles.

Figure 4:
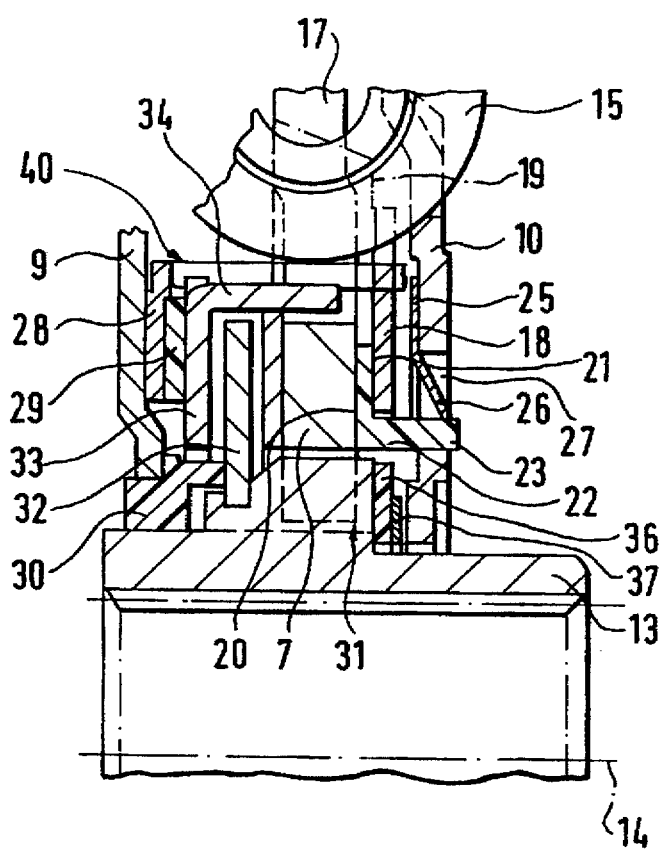
FIG. 4 shows a detail of a variation of the embodiment illustrated in FIG. 3 with a second control plate.

FIG. 4 illustrates a detail of a variant of the embodiment illustrated in FIG. 3. In contrast to FIG. 3, in FIG. 4 there is a second control plate 28 which is in contact on one side directly against the cover plate 9, and is supported with respect to the cover plate 33 either by means of a friction ring 29, or on this surface it can also have at least one device to reduce the friction force to less than metal-on-metal. This control plate 28 is preferably non-rotationally connected with the control plate 18 illustrated in FIG. 3 by means of lugs 40 which run axially, and the two control plates 18 and 28 can execute the same movement in the circumferential direction. By means of the second control plate 28, it is possible to graduate the variation of the friction force over the angle of rotation in the load range, to generate a significant increase in friction force when the lugs 19 of the control plate 18 come into contact with the circumferential terminal edges of the apertures 17 in the hub disc 7.

Figure 5:
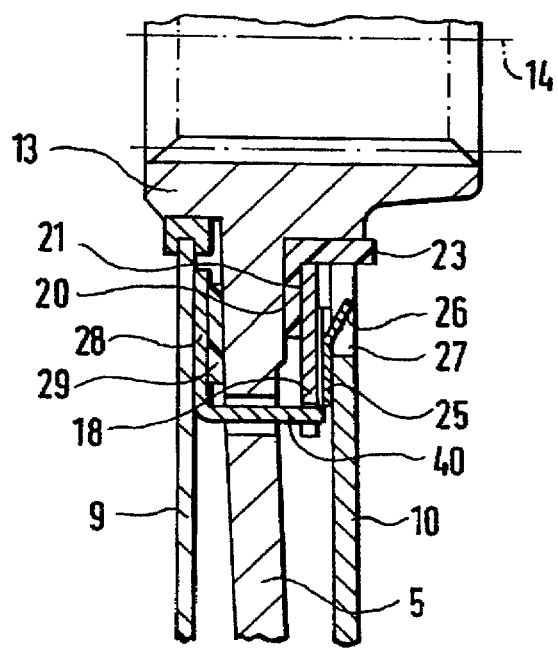
FIG. 5 shows a detail of FIG. 1 with a variation in the form of a second control plate.

FIG. 5 shows details of a variant of the embodiment illustrated in FIG. 1. The clutch disc 1, which can be constructed without a separate idle damper, is analogous to the embodiment illustrated in FIG. 4, with two control plates 18 and 28 respectively on different sides of the hub disc 5. The two control plates 18 and 28 are preferably non-rotationally connected to one another and are thus actuated simultaneously. The friction surface can thereby change from the side of the hub disc 5 to the side of the cover plate 9. As a result of the interposition of a friction ring 29 which can have a coefficient of friction which is preferably lower than metal-on-metal between the control plate 28 and the hub disc 5, an upward increase of the friction force can be achieved. But it is also possible, instead of the friction ring 29, to apply a coating to the hub disc 5 or to the control plate 28, to give this friction surface lower coefficients of friction.

In summary, the clutch disc 1 illustrated in FIG. 1 shows a hub 12 with internal gear teeth, which hub 12 can be attached to a transmission shaft (not shown). These two parts define an axis of rotation 14. Located on the hub 12 can be a hub disc 5 which preferably points radially outward, which hub disc 5 can either be realized in one piece with the hub 12 or can also be manufactured separately, and can be preferably non-rotationally connected to the hub 12 by means of gear teeth. On the two sides of the hub disc 5 there preferably are cover plates 9 and 10, which cover plates 9, 10 can be essentially permanently connected to one another and can be held at a distance from one another by means of spacer rivets 24. Friction linings 8 are preferably fastened in the radially outer area of the cover plate 9.

There preferably are spring elements 15, e.g. coil springs, in apertures 16 of the cover plates 9 and 10 and in apertures of the hub disc 5. When torque is applied between the friction linings 8 and the hub 12, these spring elements 15 preferably are compressed, and there is a spring-assisted rotation between the cover plates 9 and 10 on one hand, and the hub 12 and the hub disc 5 on the other hand. During this spring-assisted rotational movement, various friction forces should essentially be overcome which are used to damp torsional vibrations. This task can be performed by, among other things, a bearing ring 30. The bearing ring 30 can preferably be located on the inside diameter of the cover plate 9, and can be used to guide all the parts which can rotate with respect to the hub 12. On the side of the hub disc 5 opposite this bearing ring 30, a friction device can be provided which preferably includes a friction ring 22 which has an approximately L-shaped cross section. The friction ring 22 can be in contact with the hub disc 5 by means of its leg which extends radially along the hub disc 5. Lugs 23 can extend from the axially-extending leg of the friction ring 22, which lugs 23 are engaged in corresponding openings 27 in the cover plate 10, thereby preferably creating a non-rotational but axially-mobile connection between the parts 10 and 22.

Between the radial leg of the friction element 22 and the inside of the cover plate 10, there can be a control plate 18 and a spring element 25. The control plate 18, which is preferably in direct contact with the radial leg of the friction element 22, is engaged in its radially outer area with lugs 19, which lugs 19 extend essentially axially, in an aperture 17 of the hub disc 5. The lugs 19 can thus be in contact against the circumferential end surfaces of the spring element 15, which spring element 15 interacts with the lugs 19, and the lugs 19 can be larger in the circumferential direction than the spring elements 15. In this case, the spring element 25 is preferably non-rotationally connected to the cover plate 10, namely be means of lugs 26 which can be engaged essentially without play in the circumferential direction in the openings 27 of the cover plate 10. The friction element 22, in the vicinity of its leg which extends radially, can have a friction surface 20 opposite the hub disc 5, and a friction surface 21 opposite the control plate 18.

In recapitulation, the clutch disc 1 can preferably function as follows:

The spring element 25 is preferably installed with axial bias, and essentially guarantees that the components 18, 22 and 30 located between the hub disc 5 and the cover plates 9 and 10 can be held under axial bias. This axial bias is preferably absorbed by the spacer rivets 24. When torque is applied to the clutch disc 1 and there is preferably relative rotation between the two cover plates 9, 10 and the hub disc 5 in a first area, in which the spring elements 15 which interact with the lugs 19 of the control plate 18 have not yet come in contact with the apertures 17 which have a larger circumference, the following elements participate in the generation of the friction force:

The bearing ring 30, which bearing ring 30 is preferably non-rotationally connected to the cover plate 9, rubs against the hub disc 5; the friction element 22, which friction element 22 is preferably non-rotationally connected to the cover plate 10, rubs by means of its friction surface 20 against the hub disc 5; in this operating state, the control plate 18 and the spring element 25 are preferably non-rotationally connected to the cover plate 10 and thus essentially generate no friction force. As the rotation increases, the lugs 19 of the control plate 18 can come into contact with the circumferential boundary edges of the apertures 17, the control plate 18 can be held in place on the hub disc 5, and the two cover plates 9 and 10 and the friction element 22 preferably execute an additional rotational movement. In this operating state, therefore, an additional friction force essentially must be overcome, which can be generated both at the friction surface 21 between the control plate 18 and the friction element 22, and between the control plate 18 and the spring element 25. Depending on the realization of these additional friction surfaces with regard to their coefficients of friction, it can also be possible to realize large jumps in friction forces. Naturally, both the friction element 22 and the control plate 18 can be provided with special coatings to generate appropriate friction forces. It is also possible to connect the spring element 25 non-rotationally with the control plate 18, in which case the friction surface opposite the cover plate 10 becomes active. It is also possible to realize the spring element 25 so that it is preferably non-rotationally connected to the friction element 22, by having the spring element 25 surround at least one of the axial lugs 23 of the friction element 22 from both sides, essentially without clearance.

As a result of the construction described above, in spite of the use of a single spring element 25, it could be possible to employ additional friction surfaces which are a function of the angle of rotation, which means that significant increases in friction can be achieved. It is also possible to have a non-rotational connection of the friction element 22 on the hub disc 5, but that requires that the lugs 19 of the control plate 18 be engaged in the apertures 16, and the apertures 16 must essentially be larger in their circumferential length than the spring elements 15.

Concerning the spring element 25, the spring element 25, in other words provides bias on the control plate 18 to, in turn, bias the control plate 18 against the common friction surface 21, which common friction surface 21 is formed by the friction element 22 and control plate 18. The side of spring element 25, axially opposite the control plate 18, makes contact with the cover plate 10.

It may be noted that if the axis of rotation 14 in FIG. 1 were to be considered a line of division of FIG. 1, the FIG. 1 can be viewed as two separate embodiments, and the two embodiments can operate similarly.

FIG. 1 can be considered one embodiment with the upper cross section drawn at one angle with respect to the longitudinal axis of FIG. 1. The lower portion of FIG. 1 in this embodiment can be drawn at another angle with respect to the same longitudinal axis.

FIG. 1 may also be considered one embodiment with the cross section being drawn along the longitudinal axis.

In summarization, FIG. 2 shows a clutch disc 2 which, in terms of its basic structure, is essentially a reversal of FIG. 1. "Reversal" in this case essentially means that the friction linings 8 are preferably fastened to the centrally located hub disc 6, and this disc 6, as the input part, can be rotated with respect to the hub 12, while the two side discs 11 can be essentially permanently connected to the hub 12 and can correspond to the output parts. The further construction of this clutch disc 2 is preferably such that between the one side disc 11 and hub disc 6, there is preferably a friction ring 38, while on the opposite side, between the other side disc 11 and the hub disc 6, there is preferably a friction element 22, a control plate 18 and a spring element 25. The friction element 22 can preferably be in direct contact with the hub disc 6 by means of its radially-extending leg which extends along the hub disc 6. The axially-extending leg of the friction element 22 can preferably have lugs 23 extending from it which are preferably non-rotationally engaged in corresponding openings in the side disc 11. In this case, the spring element 25 is also preferably non-rotationally connected to the side disc 11, namely by means of lugs 26 which can preferably be engaged circumferentially essentially without play in corresponding openings 27 of disc 11. The control plate 18 can be provided with tabs or lugs 19 which can preferably be engaged in corresponding apertures of the hub disc 6, whereby the tabs 19 can interact with corresponding spring elements 15, and the two elements 15 and 19 can be located in apertures of the hub disc 6, which apertures can have a larger circumference than the spring elements 15.

In terms of function, there is essentially no difference from the embodiment illustrated in FIG. 1. In this construction, it is also theoretically possible to connect the friction element 22 non-rotationally to the hub disc 6, in which case the tabs or lugs 19 of the control plate 18 essentially must engage in apertures of the side disc 11 which are circumferentially larger.

It may be noted that if the axis of rotation 14 in FIG. 2 were to be considered a line of division of FIG. 2, the FIG. 2 can be viewed as two separate embodiments, and the two embodiments can operate similarly.

FIG. 2 can be considered one embodiment with the upper cross section drawn at one angle with respect to the longitudinal axis of FIG. 2. The lower portion of FIG. 2 in this embodiment can be drawn at another angle with respect to the same longitudinally axis.

FIG. 2 may also be considered one embodiment with the cross section being drawn along the longitudinal axis.

In summary, FIG. 2a also shows a clutch disc 2 and is analagous to FIG. 2. The two side discs 11a and 11b are essentially permanently connected to the hub 12. The further construction of this clutch disc 2 is preferably such that between the side disc 11a and the hub disc 6, there is preferably a friction ring 38, while on the opposite side, between the other side disc 11b and the hub disc 6, there is preferably a friction element 22, a control plate 18 and a spring element 25. The friction element 22 can preferably be in direct contact with the hub disc 6 by means of its radially-extending leg which extends along the hub disc 6. The axially-extending leg of the friction element 22 can preferably have lugs 23 extending from it which are preferably non-rotationally engaged in corresponding openings in the side disc 11b. In this case, the spring element 25 is also preferably non-rotationally connected to the side disc 11b, namely by means of lugs 26 which can preferably be engaged circumferentially essentially without play in corresponding openings 27 of disc 11b. The control plate 18 can be provided with tabs or lugs 19 which can preferably be engaged in corresponding apertures of the hub disc 6, whereby the tabs 19 can interact with corresponding spring elements 15, and the two elements 15 and 19 can be located in apertures of the hub disc 6, which apertures can have a larger circumference than the spring elements 15.

In terms of function, there is essentially no difference from the embodiment illustrated in FIG. 1. In this construction, it is also theoretically possible to connect the friction element 22 non-rotationally to the hub disc 6, in which case the tabs or lugs 19 of the control plate 18 preferably engage in apertures of the side disc 11b which are circumferentially larger.

It may be noted that if the axis of rotation 14 in FIG. 2a were to be considered a line of division of FIG. 2a, the FIG. 2a can be viewed as two separate embodiments, and the two embodiments can operate similarly.

FIG. 2a can be considered one embodiment with the upper cross section drawn at one angle with respect to the longitudinal axis of FIG. 2a. The lower portion of FIG. 2a in this embodiment can be drawn at another angle with respect to the same longitudinal axis.

FIG. 2a may also be considered one embodiment with the cross section being drawn along the longitudinal axis.

FIG. 3, in recapitulation, illustrates the application of the teaching of the invention to a clutch disc 3 on which there can be an idle damper 35. The clutch disc 3 preferably has a hub 13, which hub 13 can have internal gear teeth and can define an axis of rotation 14. The hub 13 can also have a hub disc 7, which hub disc 7 can be manufactured separately from the hub 13. The two parts are preferably non-rotationally connected to one another by means of gear teeth 31, taking into consideration a rotational clearance which defines the range of operation of the idle damper. On both sides of the hub disc 7 there are cover plates 9 and 10 which are preferably non-rotationally connected to one another and can be held at a distance from one another by means of spacer rivets 24. One of these cover plates 9 or 10 can be provided with friction linings 8. In apertures 16 of the cover plates 9 and 10, and in apertures 17 of the hub disc 7, there can be spring elements 15 which are preferably compressed when torque is applied. Immediately radially inside the spring elements 15 there can preferably be a friction device for the load range or area, which friction device may include a friction element 22 non-rotationally connected, by means of lug 23, to the cover plate 10, and a control plate 18 located between the cover plate 10 and the friction element 22. The control plate 18 can be provided with tabs or lugs 19 located on the radial outside, which tabs or lugs 19 extend axially.

Furthermore, between the control plate 18 and the cover plate 10 there can be a spring element 25, which spring element 25 is preferably braced against the inside of the cover plate 10. The lugs 19 of the control plate 18 can extend in the axial direction into the apertures 17 of the hub disc 7, which apertures 17 are preferably larger in the circumferential direction than the length of the spring elements 15, and which apertures 17 can be in contact with the end surfaces of the spring elements 15 (when a load is not being applied to the spring elements 15). In this case, the spring element 25 is preferably non-rotationally connected to the cover plate 10 by means of lugs 26, which lugs 26 can be engaged in corresponding opening 27 of cover plate 10.

On the side of the hub disc 7 opposite this friction device, there can be an idle damper 35. The idle damper 35 preferably includes a hub disc 32 which is preferably non-detachably fastened to the hub 13. There can also be a cover plate 33 which can be located on the side of the hub disc 32 farther from the hub disc 7. The cover plate 33 can preferably be non-rotationally connected to the hub disc 7 by means of lugs 34 which exstend axially. Cover plate 33 can preferably also be axially supported against the hub disc 7. There can be a friction ring 29 between the cover plate 33 and the cover plate 9. However, it can also be possible to have a metal-on-metal friction surface here.

In apertures of the hub disc 32 and in apertures of the cover plate 33, and in depressions of the hub disc 7, all of which cannot be seen in the view shown in FIG. 3, there can be spring elements 41 for the idle damper. Furthermore, in the radially inner area of the cover plate 9, there is preferably a bearing ring 30 which can provide guidance for the cover plates 9 and 10 with respect to the hub 13. This bearing ring 30 is preferably simultaneously in contact with the outside of the cover plate 32 and acts as an axial stop. On the opposite side of the bearing ring 30, in the gear tooth area 31, axially outside the hub disc 7 between the gear teeth 31 and the cover plate 10, there can be a friction ring 36 and a friction spring 37. These components 30, 36 and 37 can generate a basic friction which is preferably effective over the entire angle of rotation of the clutch disc 3. The parts 36 and 37 are thereby located radially inside the friction element 22.

The bearing ring 30, which can provide guidance for the cover plates 9 and 10 with respect to the hub 13 can preferably be in contact with the axial outside and the radial inside of the cover plate 32.

The clutch disc can preferably function as follows:

When a low torque is applied to the friction lining 8, and as long as there is still clearance between the gear teeth 31, essentially only the spring force of the spring elements 41 is active, along with the friction force of the components 30, 36 and 37. When greater torques are applied, and then, as the clearance between the teeth 31 is closed, the hub disc 7 remains non-rotationally connected to the hub 13 with respect to the rotational movement of the cover plates 9 and 10. In this area it is essentially no longer the spring elements 41 which are active, but the friction force of the elements 30, 36 and 37. In addition, the low range of the load friction is actuated, such that a relative motion takes place between the cover plate 9 and the cover plate 33 on the one hand, and between the cover plate 10 and the hub disc 7 on the other hand. In this first stage of the load friction device, the control plate 18 moves conformally with the cover plate 10 and the friction element 22. Consequently, a friction force occurs only on the friction surface 20, and between the cover plate 9 and the cover plate 33. As the angle of rotation increases, the lugs 19 of the control plate 18 come into contact with the circumferential boundary edges of the apertures 17 of the hub disc 7, which results in a jump in the friction force to higher levels. As a result of this contact of the lugs 19, there is then a relative movement between the cover plate 10 and the friction element 22 on one hand, and the hub plate 7 and the control plate 18 on the other hand. In addition to the friction surfaces indicated above, there is also a friction surface 21 between the control plate 18 and the friction element 22 which becomes active, as does the friction surface between the spring element 25 and the control plate 18. Since the control plate 18 and the spring element 25 are conventionally made of metal, a high friction force is generated between the two surfaces. The friction force on the friction surface 21 can be set as desired, e.g. by applying an appropriate coating to the friction element 22 or the control plate 18. Preferably, the friction element 22 is made of plastic, and the coefficient of friction on the friction surface 20 can be kept relatively low. The friction surface effective between the cover plate 33 and the cover plate 9 can also be varied within a wide range in terms of its coefficient of friction.

This construction can make possible a significantly wider variation of the friction force, as a function of the angle of rotation, and without additional components, than do known friction clutches, so that the basic structure can be retained, even if the clutch disc is used in different motor vehicles.

In recapitulation, FIG. 3a shows a modified detail of the embodiment which is illustrated in FIG. 3. In this case, the non-rotational connection between the cover plate 10 as the input part and the friction element—here labeled 42—is preferably made by means of one or more lugs 43 located on the cover plate 10, which lugs 43 extend essentially axially toward the friction element 42. The lugs 43 can be engaged essentially without clearance in corresponding recesses 44. Such a non-rotational connection can preferably absorb a high load, since, on one hand, there can be multiplicity of lugs 43 distributed around the circumference of the cover plate 10, and on the other hand, these lugs 43 can be bent out of the metal of the cover plate 10.

FIGS 3b and 3c, in summary, illustrative variants of the friction element 42, whereby in both cases, the area with the recesses 44 is preferably displaced out of the plane of the friction element 42 toward the cover plate 10, namely to essentially achieve a 100% overlap with the lugs 43, thereby reducing the surface pressure. This measure can be advantageous, since the end surfaces of the lugs 43, which lugs 43 should be realized so that they face toward the hub disc 7, should be manufactured with larger tolerances under some conditions, and also because the relative position between the hub disc 7 and the cover plate 10 is also a function of the wear of the friction rings 29 and 42, respectively.

FIG. 3d is essentially the same as FIG. 3, and may be considered an embodiment of the present invention. FIG. 3d illustrates the application of the teaching of the invention to a clutch disc 3 on which there can be an idle damper 35. The clutch disc 3 preferably has a hub 13, which hub 13 can have internal gear teeth and can define an axis of rotation 14. The hub 13 can also have hub disc 7, which hub disc 7 can be manufactured separately from the hub 13. The two parts are preferably non-rotationally connected to one another by means of gear teeth 31, taking into consideration a rotational clearance which defines the range of operation of the idle damper. On both sides of the hub disc 7 there are cover plates 9 and 10 which are preferably non-rotationally connected to one another and can be held at a distance from one another by means of spacer rivets 24. One of these cover plates 9 or 10 can be provided with friction linings 8. In apertures 16 of the cover plates 9 and 10, and in apertures 17 of the hub disc 7, there can be spring elements 15 which are preferably compressed when torque is applied. Immediately radially inside the spring elements 15 there can preferably be a friction device for the load range or area, which friction device may include a friction element 22 non-rotationally connected, by means of lugs 23, to the cover plate 10, and a control plate 18 located between the cover plate 10 and the friction element 22. The control plate 18 can be provided with tabs or lugs 19 located on the radial outside, which tabs or lugs extend axially.

Furthermore, between the control plate 18 and the cover plate 10 there can be a spring element 25, which spring element 25 is preferably braced against the inside of the cover plate 10. The lugs 19 of the control plate 18 can extend in the axial direction into the apertures 17 of the hub disc 7, which apertures 17 are preferably larger in the circumferential direction than the length of the spring elements 15, and which apertures 17 can be in contact with the end surfaces of the spring elements 15 (when a load is not being applied to the spring elements 15). In this case, the spring element 25 is preferably non-rotationally connected to the cover plate 10 by means of lugs 26, which lugs 26 can be engaged in corresponding openings 27 of cover plate 10.

On the side of the hub disc 7 opposite this friction drive, there can be an idle damper 35. The idle damper 35 preferably includes a hub disc 32 which is preferably non-detachably fastened to the hub 13. There can also be a cover plate 33 which can be located on the side of the hub disc 32 farther from the hub disc 7. The cover plate 33 can preferably be non-rotationally connected to the hub disc 7 by means of lugs 34 which extend axially. Cover plate 33 can preferably also be axially supported against the hub disc 7. There can be a friction ring 29 between the cover plate 33 and the cover plate 9. However, it can also be possible to have a metal-on-metal friction surface here.

In apertures of the hub disc 32 and in apertures of the cover plate 33, and in depressions of the hub disc 7, all of which cannot be seen in the view shown in FIG. 3, there can be spring elements 41 for the idle damper. Furthermore, in the radially inner area of the cover plate 9, there is preferably a bearing ring 30 which can provide guidance for the cover plates 9 and 10 with respect to the hub 13. This bearing ring 30 is preferably simultaneously in contact with the outside of the cover plate 32 and acts as an axial stop. On the opposite side of the bearing ring 30, in the gear tooth area 31, axially outside the hub disc 7 between the gear teeth 31 and the cover plate 10, there can be a friction ring 36 and a friction spring 37. These components 30, 36 and 37 can generate a basic friction which is preferably effective over the entire angle of rotation of the clutch disc 3. The parts 36 and 37 are thereby located radially inside the friction element 22.

The bearing ring 30, which can provide guidance for the cover plates 9 and 10 with respect to the hub 13 can preferably be in contact with the axial outside and the radial inside of the cover plate 32.

The clutch disc can preferably function as follows:

When a low torque is applied to the friction lining 8, and as long as there is still clearance between the gear teeth 31, essentially only the spring force of the spring elements 41 is active, along with the friction force of the components 30, 36 and 37. When greater torques are applied, and then, as the clearance between the gear teeth 31 is closed, the hub disc 7 remains non-rotationally connected to the hub 13 with respect to the rotational movement of the cover plates 9 and 10. In this area it is essentially no longer the spring elements 41 which are active, but the friction force of the elements 30, 36 and 37. In addition, the low range of the load friction is actuated, such that a relative motion takes place between the cover plate 9 and the cover plate 33 on the one hand, and between the cover plate 10 and the hub disc 7 on the other hand. In this first stage of the load friction device, the control plate 18 moves conformally with the cover plate 10 and the friction element 22. Consequently, a friction force occurs only on the friction surface 20, and between the cover plate 9 and the cover plate 33. As the angle of rotation increases, the lugs 19 of the control plate 18 come into contact with the circumferential boundary edges of the apertures 17 of the hub disc 7, which results in a jump in the friction force to higher levels. As a result of this contact of the lugs 19, there is then a relative movement between the cover plate 10 and the friction element 22 on one hand, and the hub plate 7 and the control plate 18 on the other hand. In addition to the friction surfaces indicated above, there is also a friction surface 21 between the control plate 18 and the friction element 22 which becomes active, as does the friction surface between the spring element 25 and the control plate 18. Since the control plate 18 and the spring element 25 are conventionally made of metal, a high friction force is generated between the two surfaces. The friction force on the friction surface 21 can be set as desired, e.g. by applying an appropriate coating to the friction element 22 or to the control plate 18. Preferably, the friction element 22 is made of plastic, and the coefficient of friction on the friction surface 20 can be kept relatively low. The friction surface effective between the cover plate 33 and the cover plate 9 can also be varied within a wide range in terms of its coefficient of friction.

This construction can make possible a significantly wider variation of the friction force, as a function of the angle of rotation, and without additional components, than do known friction clutches, so that the basic structure can be retained, even if the clutch disc is used in different motor vehicles.

In summary, FIG. 4 illustrates a detail of a variant of the embodiment illustrated in FIG. 3. In contrast to FIG. 3, in FIG. 4 there is a second control plate 28, which control plate 28 can be in contact on one side essentially directly against the cover plate 9, and is supported with respect to the cover plate 33 either by means of a friction ring 29, or on this surface it can also have at least one device to reduce the friction force to less than metal-on-metal. This control plate 28 is preferably non-rotationally connected with the control plate 18 illustrated in FIG. 3 by means of lugs 40 which extend axially, and the two control plates 18 and 28 can execute the same movement in the circumferential direction. By means of the second control plate 28, it is possible to graduate the variation of the friction force over the angle of rotation in the load range, to generate a significant increase in friction force when the lugs 19 of the control plate 18 come into contact with the circumferential terminal edges of the apertures 17 in the hub disc 7.

FIG. 5, in recapitulation, shows details of a variant of the embodiment illustrated in FIG. 1. The clutch disc 1, which can be constructed without a separate idle damper, is analogous to the embodiment illustrated in FIG. 4, with two control plates 18 and 28 on opposite sides of the hub disc 5. The two control plates 18 and 28 are preferably non-rotationally connected to one another and are thus actuated simultaneously. The friction surface can thereby change from the side of the hub disc 5 to the side of the cover plate 9. As a result of the interposition of a friction ring 29 which can have a coefficient of friction which is preferably lower than metal-on-metal between the control plate 28 and the hub disc 5, an upward increase of the friction force can be achieved. But it is also possible, instead of the friction ring 29, to apply a coating to the hub disc 5 or to the control plate 28, to give this friction surface lower coefficients of friction.

In one embodiment of the present invention, the spring element 25 can be a zig-zag spring. In such an embodiment, the zig-zag spring can preferably have the following characteristics and the following functions:

The zig-zag spring essentially has the shape of an ondular washer. That is, it comprises a planar, washer-shaped element having an axis of rotation perpendicular to the plane, an outer circumference, and an inner circumference. The washer has ridges, or ondulations, formed radially about the axis of rotation and protruding above and below the plane. The washer has the general characteristic of being compressible in the axial direction by an outside force. The force exerted on the washer is stored as potential energy. The potential energy of the washer is generally released in a direction essentially parallel to the axis of rotation, in opposite directions and in equal amounts. In the case of a clutch, in which the zig-zag spring, or washer, is coaxial with respect to the hub and is mounted on the hub, the potential energy resulting in the spring from axially-directed compression of the spring is converted to a frictional force between the cover plate and the guide element.

In one embodiment of the present invention, such as shown in FIG. 1, the zig-zag spring, or ondular washer, can be realized as having at least a first apex and a second apex protruding above the plane of the washer; for every combination of a first apex and a second apex on one side of the plane of the washer there can be a corresponding low point between those two apices, and every low point thus can be equivalent to an apex on the opposite side of the plane of the washer, or zig-zag spring. That is, if a zig-zag spring has, for example, 30 apices, or high points on one side of the planar element, it therefore would have 30 apices on the opposing side of the planar element. In this embodiment, the apices on one side of the plane of the spring may be named 10a, 10b, 10c, etc. to correspond to their relationship adjacent to the cover plate 10, as depicted in FIG. 1. Apices on the directly opposite side of the plane of the washer may be named 18a, 18b, 18c, etc to correspond to adjacency with respect to control plate, or guide element 18. The zig-zag spring would, therefore have between these apices, the elements, which connect these apices, named in succession, 10a–18a, 18a–10b, 10b–18b, 18b–10c, 10c–18c, 18c–10d, 10d–18d, and so forth. As the cover plate 10 preferably rotates the presses against the zig-zag spring, or spring element 25, and the spring element 25 is essentially compressed against the control plate, or guide element 18, all, or at least some of the cross-planar elements between the corresponding apices would be compressed axially inwardly and radially; those elements which are facing generally into the direction of the most force would be compressed most, and thus would preferably generate the most frictional force.

In other words, if the force of the cover plate 10 can be in the direction of a to d, then the most force may be applied by this cover plate 10 to elements with the suffix "-a—a", "-b—b", "-c—c", "-d—d", etc., these being first-named elements, and the least amount of direct force would be applied to all elements with the suffices which are mixed, such as "-a-b", "-b-c", "-c-d", etc., these being second-named elements. In this embodiment, all first-named elements would preferably be compressed and contorted into a shape which their structure would resist, and all second-named elements would be "stretched" into a shape which their structure would resist. The abovementioned force can preferably be transferred from the cover plate 10 to the control plate, or guide element 18, via the zig-zag spring. Thus as the control plate, or guide element 18 would move with respect to the force on the friction ring 22, the force can be first small then increase as the first-named elements are put under compression.

In one embodiment of the present invention, such as shown in FIG. 1, and discussed hereinabove, the zig-zag spring can be realized as comprising secondary ondulations, or corrugations on the apices of the spring. In this case, the secondary ondulations, located on the radially-oriented apices of the spring, preferably are also oriented radially. The secondary ondulations are essentially smaller than the apices, or primary ondulations of the spring. The secondary ondulations are named to correspond to the apices. That is, apex 10a could comprise at least one secondary ondulation named 10a'; apex 18a could comprise at leasat one secondary ondulation named 18a', and so on. In this embodiment, the function of the primary ondulations essentially remains unchanged. With the addition of secondary ondulations, however, the zig-zag spring can undergo further compression and stretching due to the added flexibility provided by the secondary ondulations.

In other words, as the zig-zag spring would be compressed, the apex 10a, having secondary ondulations 10a', can preferably be stretched, the ondulations 10a' would thus be stretched and the length 10a–18a compressed. In this embodiment, apex 18a, preferably comprising secondary ondulations 18a', would be compressed. The length of the zig-zag spring 18a–10b, located between apices 18a and 10b, would preferably be stretched. The secondary ondulations 10b', of the apex 10b of the zig-zag spring, can be stretched essentially the same as the secondary ondulations 10a' of the apex 10a. The length 10b–18b between the apices 10b and 18b would be compressed, essentially the same as the length 10a–18a.

As rotation of the cover plate 10 and the guide element, or control plate 18, may have an essential reversal of rotation in relation to one another, the compression and stretching of the various components of the zig-zag spring can preferably have an essential reversal of the order of parts undergoing compression and stretching along with an essential reversal of compression to stretching, and stretching to compression in relation to each component of the zig-zag spring.

If not otherwise stated hereinabove, it should generally be understood that the terms "zig-zag spring" and "ondular washer" as used and discussed above with relation to FIGS. 1–5may, if appropriate, essentially be considered to be interchangeable.

If not otherwise stated hereinabove, it should generally be understood that the terms "control plate" and "guide element" as used and discussed above with relation to FIGS. 1–5 may, if appropriate, essentially be considered to be interchangeable.

If not otherwise stated hereinabove, it should generally be understood that the terms "lugs" and "tabs" as used and discussed above with relation to FIGS. 1–5 may, if appropriate, essentially be considered to be interchangeable.

If not otherwise stated hereinabove, it should generally be understood that the terms "zig-zag spring", "ondular washer", "corrugated washer", "annular washer", and "undular washer", as used and discussed above with relation to FIGS. 1–5 may, if appropriate, essentially be considered to be interchangeable.

One feature of the invention resides broadly in the friction clutch with clutch disc, comprising at least one essentially disc-shaped input part with friction linings in its radially outer area, at least one essentially disc-shaped output part which has a hub in its radially inner area with internal gear teeth so that it can be placed on a transmission shaft which defines an axis of rotation, whereby the two overlap axially over a portion of their radial extent, and in this area apertures are provided for the location of spring elements for their mutual spring-assisted rotation when torque is applied, and in the area of the axial overlap there is also a friction device which has a friction-generating spring device and a control plate with friction surfaces, characterized by the fact that the friction device consists of at least one friction element 22, 42 and the control plate 18, and the control plate 18 forms a common friction surface 21 with the friction element 22, whereby the friction element 22, 42 is connected non-rotationally but so that it can move axially with one of the two parts, i.e. the input part or the output part, and is simultaneously in frictional contact by means of a friction surface 20 with the other of the two parts, i.e. the input part or the output part.

Another feature of the invention resides broadly in the friction clutch whereby the control plate generates no friction or very little friction in a first area of angular rotation, and generates an increased friction in a second area adjacent to it, characterized by the fact that the friction element 22, 42 is connected non-rotationally with the input part 10 and is in contact with the output part 5, and the control plate 18 is located between the friction element 22, 42 and the input part 10.

Yet another feature of the invention resides broadly in the friction clutch whereby the control plate generates no friction or very little friction in a first area of angular rotation and generates a greater friction in a second area of angular rotation adjacent to it, characterized by the fact that the friction element 22, 42 is non-rotationally connected to the output part 11 and is in contact with the input part 6, and the control plate 18 is located between the friction element 22, 42 and the output part 11.

Still another feature of the invention resides broadly in the friction clutch characterized by the fact that the spring device which generates the friction force has a spring element 25 which is realized in the form of a zig-zag spring or a plate spring, and is preferably located between the control plate 18 and the input part 10 or output part 11.

A further feature of the invention resides broadly in the friction clutch characterized by the fact that the spring element 25 simultaneously functions as a friction element, and is preferably connected non-rotationally to the input part 10, the output part 11 or the control plate 18.

Another feature of the invention resides broadly in the friction clutch characterized by the fact that the spring element 25 is realized in the form of an encircling ring with lugs 26 which run diagonally inward or outward and which are engaged in corresponding openings 27.

Yet another feature of the invention resides broadly in the friction clutch whereby the spring element is non-rotationally connected to the input part or output part, characterized by the fact that the friction element 42 is realized in the form of a friction ring, with recesses 44 on the radial inside, in which are engaged lugs 43 which run essentially axially toward the friction element 22, 42, and which are provided on the input part 10 or the output part 11.

Still another feature of the invention resides broadly in the friction clutch whereby the spring element is non-rotationally connected to the input part or output part, characterized by the fact that the friction element 22 is realized in the form of a friction ring with axially-projecting lugs 23 attached to the radial inside, which lugs 23 engage without play in corresponding openings 27 of the input part 10 or of the output part 11, and the spring element 25 surrounds at least one of the lugs 23 on both sides to drive both of the parts without any play or clearance.

A further feature of the invention resides broadly in the friction clutch characterized by the fact that the hub disc 7 is realized in the form of an output part and is non-rotationally located by means of gear teeth 31 with play or clearance in the circumferential direction on the hub 13, and the friction element 22 which is non-rotationally connected to the cover plate 10, the control plate 18 and the spring element are located between the hub disc 7 and the one cover plate 10 which functions as an input part, and on the side of the hub disc 7 opposite the friction element 22 are located an idle damper 35 with a hub disc 32 which is permanently connected to the hub 13 and with cover plates 33 and springs 39 in apertures of the cover plate 33 and hub disc 32 at least on the side of the hub disc 32 located farther from the hub disc 7.

Another feature of the invention resides broadly in the friction clutch characterized by the fact that the cover plate 33 is non-rotationally connected with and is axially supported by means of axially-bent lugs 34 on the hub disc 7, and a friction ring 29 and an additional control plate 28 may be located between the cover plate 33 and the other cover plate 9.

Yet another feature of the invention resides broadly in the friction clutch characterized by the fact that the second control plate 28 is connected non-rotationally with the control plate 18, possibly by means of integral lugs which run axially and are located on the control plate 28, which lugs run through the hub disc 7 with clearance and are engaged without clearance in openings in the control plate 18, and the control plate 28 is in direct contact with the cover plate 9, and the friction ring 29 is located between the control plate 28 and the cover plate 33.

Still another feature of the invention resides broadly in the friction clutch characterized by the fact that there is a second control plate 28 which is non-rotationally connected to the first control plate 18 and is located on the side of the hub disc 5, 6 opposite the first control plate 18.

A further feature of the invention resides broadly in the friction clutch characterized by the fact that the additional control plate 28 is in contact with the hub disc 5, 6 by means of a friction ring 29 and there is metal-on-metal contact with the cover plate 9.

Another feature of the invention resides broadly in the friction clutch characterized by the fact that the friction element 22 has an L-shaped cross section, with a leg running axially and located on the radial inside, from which the lugs 23 extend.

Yet another feature of the invention resides broadly in the friction clutch characterized by the fact that the friction element 22 is preferably made of plastic.

Still another feature of the invention resides broadly in the friction clutch characterized by the fact that the friction element 22, 42 has different coefficients of friction on its two friction surfaces 20, 21.

Types of zig-zag springs which may be utilized in accordance with the present invention may be disclosed in U.S. Pat. No. 4,832,320, issued May 23, 1989 to Scowen et al., and U.S. Pat. No. 4,778,404, issued Oct. 18, 1988 to Pass.

Examples of axially-acting springs, plate-type springs, or plate springs, which may be utilized in accordance with at least one embodiment of the present invention may be found in the following U.S. Pat. Nos. 4,844,226 issued Jul. 4, 1989 to Taketani; 4,787,492 issued Nov. 29, 1988 to Ball et al.; 4,704,554 issued Nov. 3, 1987 to Nishimura; and 4,641,736 issued Feb. 10, 1987 to Forster.

Other types of clutch discs for use in motor vehicles, and components thereof, including torsional vibration dampers, which could possibly be used in conjunction with the embodiments of the present invention as set forth hereabove can possibly be found in the following U.S. Pat. Nos. 5,205,389 to Raab and Ament, entitled "Clutch Disc"; 5,372,793 to Ammer, Hartner, and Geissler, entitled "Process of Manufacturing a Friction Ring for Use in a Clutch or Brake"; 5,230,415 to Ament and Raab, entitled "Clutch Plate for a Motor Vehicle Friction Clutch"; and 5,291,978 to Numata, entitled "One Way Clutch Having Outer and Inner Retainers Each Made of Plastics".

Additionally, other types of clutch discs for use in motor vehicles, and components thereof, including friction rings, which could possibly be used in conjunction with the embodiments of the present invention as set forth hereabove can possibly be found in the following U.S. Pat. Nos. 4,249,660 to Feldhaus, Fischer, and Jeepe, entitled "Clutch Disc for a Motor Vehicle Friction Clutch"; 5,307,911 to Robinson, entitled "Two-way Clutch"; 5,314,052 to Henrion, entitled "Progressive Dry Friction Clutch Plate"; and 5,337,870 to Hays, entitled "Clutch Design and Manufacture".

Examples of types of materials, and examples of coatings, with various coefficients of friction, which could possibly be used in conjunction with the embodiments of the present invention as set forth hereabove can possibly be found in the following U.S. Pat. Nos.: 4,539,233 to Melotik et al; 5,033,599 to Hays; 4,593,802 to Danko; 4,630,332 to Bisbing; 5,004,497 to Shibata et al; and 4,951,793 to Hays.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 42 868.5, filed on Dec. 2, 1994, having inventor Norbert Ament, and DE-OS P 44 42 868.5 and DE-PS P 44 42 868. 5, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a transmission, said friction clutch comprising a clutch disc, said clutch disc comprising:

hub means;

said hub means having an axis of rotation;

said clutch disc having an axial direction substantially parallel to the axis of rotation;

an output part being disposed on said hub means;

an input part being rotationally disposed on said hub means;

friction lining means being disposed on said input part;

means for transmitting rotational motion between said input part and said output part;

means for damping rotational motion between said input part and said output part;

friction means for generating a frictional force between said input part and said output part;

said friction means comprising friction element means;

means for permitting said friction element means to move axially and to engage non-rotationally with one of said input part and said output part;

said friction element means being rotationally disposed to make frictional contact with the other of said input part and said output part;

said friction means comprising control plate means;

said control plate means being disposed to make frictional contact with said friction element means;

said friction means comprising:

means for generating a first frictional force between said input part and said output part during a first angular rotation of said input part relative to said output part; and means for generating a second frictional force between said input part and said output part during a second angular rotation of said input part relative to said output part;

said axial and non-rotational engagement means connecting said friction element means to said input part;

said friction element means being rotationally disposed to make frictional contact with said output part; and said control plate means being disposed between said friction element means and said input part.

2. The friction clutch according to claim 1, wherein:

said friction means comprises means for biasing said control plate means toward said friction element means, said means for biasing is substantially disposed axially between said control plate means and said input part; and said means for biasing said control plate means comprises a spring element.

3. The friction clutch according to claim 2, wherein:

said spring element comprises a friction surface disposed between said spring element and one of:
  said input part; and
  said control plate means; and said spring element is non-rotationally connected to the other of:
  said input part; and
  said control plate means.

4. The friction clutch according to claim 3, wherein:

said clutch disc comprises means for non-rotationally connecting said spring element to said input part;

said friction element means comprises a friction ring;

said friction ring comprises an inner portion and an outer portion, said outer portion of said friction ring is radially farther from the axis of rotation than said inner portion of said friction ring; and said axial movement and non-rotational engagement means comprises one of:
  a) a plurality of recesses disposed in said inner portion of said friction ring and a plurality of lugs extending from said input part and being disposed within said plurality of recesses; and
  b) a plurality of apertures disposed in said input part and a plurality of lugs disposed on said inner portion of said friction ring, said friction ring plurality of lugs extend substantially axially toward said input part and said friction ring plurality of lugs are disposed within said input part plurality of apertures to drive said friction ring with said input part, and said spring element comprises a portion configured to surround at least one lug of said friction ring plurality of lugs to connectedly drive said spring element.

5. The friction clutch according to claim 2, wherein:

said hub means comprises a hub;

said output part comprises a hub disc having a first side and a second side;

said hub disc and said hub comprise means for meshing with one another to provide a predetermined angular range of rotational movement between said hub disc and said hub;

said input part comprises a cover plate disposed substantially adjacent said first side of said hub disc;

said friction ring, said control plate means, and said spring element are disposed axially between said first side of said hub disc and said cover plate;

said clutch disc comprises idle damper means for damping the predetermined angular range of rotational movement between said hub disc and said hub, said idle damper means is substantially adjacent said second side of said hub disc;

said hub disc comprises a first hub disc;

said idle damper means comprises an additional cover plate, a plurality of idle spring elements, and a second hub disc, said second hub disc coaxially surrounds said hub and is non-rotationally affixed to said hub;

said second hub disc comprises a plurality of apertures disposed therein, and a first side and a second side, said first side of said second hub disc faces axially toward said first hub disc;

said additional cover plate comprises a plurality of apertures disposed therein and is disposed axially adjacent said second side of said second hub disc;

said plurality of apertures of said second hub disc and said plurality of apertures of said additional cover plate are aligned with one another; and said plurality of idle spring elements is disposed within said plurality of aligned apertures.

6. The friction clutch according to claim 5, wherein:

said idle damper means comprises means for non-rotationally connecting said additional cover plate to said first hub disc;

said idle damper means comprises apertures disposed in said first hub disc;

said additional cover plate non-rotational connecting means comprises lugs extending from said additional cover plate, said lugs of said additional cover plate extend axially toward said first hub disc, and said lugs are engaged in said apertures in said first hub disc;

said additional cover plate is non-rotationally connected to said first hub disc;

said clutch disc comprises a second cover plate disposed axially adjacent said idle damper means and axially opposite said first cover plate with respect to said idle damper means;

said friction means comprises additional control plate means;

said friction means comprises an additional friction ring;

said additional friction ring and said additional control plate means are in frictional contact with one another and are disposed axially between said additional cover plate of said idle damper means and said second cover plate;

said additional control plate means contacts said second cover plate, and said additional friction ring is disposed axially between said additional control plate means and aid additional cover plate;

said clutch disc comprises means for non-rotationally connecting said additional control plate means to said control plate means; and said control plate connecting means comprises lugs extending axially from said additional control plate means, extending through openings in said first hub disc, and engaging openings in said control plate means.

7. The friction clutch according to claim 6, wherein:

said axial movement and non-rotational engagement means comprises said plurality of apertures disposed in said input part and said plurality of lugs disposed on said inner portion of said friction ring;

said friction ring comprises an L-shaped cross section, said L-shaped cross section comprises a first leg portion comprising said outer portion of said friction ring, and a second leg portion comprising said friction ring plurality of lugs, said first and second leg portions are substantially perpendicular to on another;

said friction ring comprises a plastic material;

said first leg portion of said friction ring comprises a first side having a first coefficient of friction and a second side having a second coefficient of friction;

said first coefficient of friction and said second coefficient of friction are substantially different from one another;

said spring element comprises one of:
a corrugated spring; and
a plate spring;

said damping means comprises apertures in said first cover plate, apertures in said second cover plate, and apertures in said first hub disc;

said apertures in said first cover plate, said apertures in said second cover plate, and said apertures in said first hub disc are aligned with one another;

said damping means comprises spring elements disposed in said aligned apertures;

said second frictional force generating means comprises lugs extending from said control plate means;

said second frictional force generating means comprises apertures disposed in said first hub disc;

said lugs of said control plate means are disposed within said apertures in said first hub disc with play; and said idle spring elements are disposed in depressions in said first hub disc.

8. The friction clutch according to claim 3, wherein:

said clutch disc comprises means for non-rotationally connecting said spring element to said input part;

said non-rotational connecting means comprises a plurality of lugs extending from said spring element;

said non-rotational connecting means comprises a plurality of apertures disposed in said input part; and said plurality of lugs of said spring element are disposed within said plurality of apertures in said input part.

9. The friction clutch according to claim 4, wherein:

said transmission comprises a transmission for a motor vehicle;

said axial movement and non-rotational engagement means comprises said plurality of apertures disposed in said input part and said plurality of lugs disposed on said inner portion of said friction ring;

said hub means comprises a hub disc comprising openings disposed therein;

said friction means comprises additional control plate means disposed axially opposite said control plate means with respect to said hub disc;

said clutch disc comprises means for non-rotationally connecting said control plate means to said additional control plate means;

said means for non-rotationally connecting said control plate means comprises lugs extending axially from said additional control plate means, said lugs extend through said openings in said hub disc and are engaged in openings in said control plate means;

said input part comprises a cover plate;

said additional control plate means is disposed to axially contact said cover plate; and said contact between said additional control plate means and said cover plate comprises a metal-to-metal contact.

10. A friction clutch for a transmission, said friction clutch comprising a clutch disc, said clutch disc comprising:

hub means;

said hub means having an axis of rotation;

said clutch disc having an axial direction substantially parallel to the axis of rotation;

an output part being disposed on said hub means;

an input part being rotationally disposed on said hub means;

friction lining means being disposed on said input part;

means for transmitting rotational motion between said input part and said output part;

means for damping rotational motion between said input part and said output part;

friction means for generating a frictional force between said input part and said output part;

said friction means comprising friction element means;

means for permitting said friction element means to move axially and to engage non-rotationally with one of said input part and said output part;

said friction element means being rotationally disposed to make frictional contact with the other of said input part and said output part;

said friction means comprising control plate means;

said control plate means being disposed to make frictional contact with said friction element means;

said friction means comprising:
 means for generating a first frictional force between said input part and said output part during a first angular rotation of said input part relative to said output part; and
 means for generating a second frictional force between said input part and said output part during a second angular rotation of said input part relative to said output part;

said axial and non-rotational engagement means connecting said friction element means to said output part;

said friction element means being rotationally disposed to make frictional contact with said input part; and said control plate means being disposed between said friction element means and said output part.

11. The friction clutch according to claim 10, wherein:

said friction means comprises means for biasing said control plate means toward said friction element means, said means for biasing is substantially disposed axially between said control plate means and said output part; and said means for biasing said control plate means comprises a spring element.

12. The friction clutch according to claim 11, wherein:

said spring element comprises a friction surface disposed between said spring element and one of:
 said output part; and
 said control plate means; and said spring element is non-rotationally connected to the other one of:
 said output part; and
 said control plate means.

13. The friction clutch according to claim 12, wherein:

said clutch disc comprises means for non-rotationally connecting said spring element to said output part;

said friction element means comprises a friction ring;

said friction ring comprises an inner portion and an outer portion, said outer portion of said friction ring is radially farther from the axis of rotation than said inner portion of said friction ring; and said axial movement and non-rotational engagement means comprises one of:
 a) a plurality of recesses disposed in said inner portion of said friction ring and a plurality of lugs extending from said input part and being disposed within said plurality of recesses; and
 b) a plurality of apertures disposed in said output part and a plurality of lugs disposed on said inner portion of said friction ring, said friction ring plurality of lugs extend substantially axially toward said output part and said friction ring plurality of lugs are disposed within said output part plurality of apertures to drive said friction ring with said output part, and said spring element comprises a portion configured to surround at least one lug of said friction ring plurality of lugs to connectedly drive said spring element.

14. The friction clutch according to claim 13, wherein:

said hub means comprises a hub;

said input part comprises a hub disc having a first side and a second side;

said hub disc and said hub comprise means for meshing with one another to provide a predetermined angular range of rotational movement between said hub disc and said hub;

said output part comprises a cover plate disposed substantially adjacent said first side of said hub disc;

said friction ring, said control plate means, and said spring element are disposed axially between said first side of said hub disc and said cover plate;

said clutch disc comprises idle damper means for damping the predetermined angular range of rotational movement between said hub disc and said hub, said idle damper means is substantially adjacent said second side of said hub disc;

said hub disc comprises a first hub disc;

said idle damper means comprises an additional cover plate, a plurality of idle spring elements, and a second hub disc, said second hub disc coaxially surrounds said hub and is non-rotationally affixed to said hub;

said second hub disc comprises a plurality of apertures disposed therein, and a first side and a second side, said first side of said second hub disc faces axially toward said first hub disc;

said additional cover plate comprises a plurality of apertures disposed therein and is disposed axially adjacent said second side of said second hub disc;

said plurality of apertures of said second hub disc and said plurality of apertures of said additional cover plate are aligned with one another; and said plurality of idle spring elements is disposed within said plurality of aligned apertures.

15. The friction clutch according to claim 14, wherein:

said idle damper means comprises means for non-rotationally connecting said additional cover plate to said first hub disc;

said idle damper means comprises apertures disposed in said first hub disc;

said additional cover plate non-rotational connecting means comprises lugs extending from said additional cover plate, said lugs of said additional cover plate extend axially toward said first hub disc, and said lugs are engaged in said apertures in said first hub disc;

said additional cover plate is non-rotationally connected to said first hub disc;

said clutch disc comprises a second cover plate disposed axially adjacent said idle damper means and axially opposite said first cover plate with respect to said idle damper means;

said friction means comprises additional control plate means;

said friction means comprises an additional friction ring;

said additional friction ring and said additional control plate means are in frictional contact with one another and are disposed axially between said additional cover plate of said idle damper means and said second cover plate;

said additional control plate means contacts said second cover plate, and said additional friction ring is disposed axially between said additional control plate means and said additional cover plate;

said clutch disc comprises means for non-rotationally connecting said additional control plate means to said control plate means; and said control plate connecting means comprises lugs extending axially from said additional control plate means, extending through openings in said first hub disc, and engaging openings in said control plate means;

said axial movement and non-rotational engagement means comprises said plurality of apertures disposed in said output part and said plurality of lugs disposed on said inner portion of said friction ring;

said friction ring comprises an L-shaped cross section, said L-shaped cross section comprises a first leg portion comprising said outer portion of said friction ring, and a second leg portion comprising said friction ring plurality of lugs, said first and second leg portions are substantially perpendicular to one another;

said friction ring comprises a plastic material;

said first leg portion of said friction ring comprises a first side having a first coefficient of friction and a second side having a second coefficient of friction;

said first coefficient of friction and said second coefficient of friction are substantially different from one another;

said spring element comprises one of:
a corrugated spring; and
a plate spring;

said damping means comprises apertures in said first cover plate, apertures in said second cover plate, and apertures in said first hub disc;

said apertures in said first cover plate, said apertures in said second cover plate, and said apertures in said first hub disc are aligned with one another;

said damping means comprises spring elements disposed in said aligned apertures;

said second frictional force generating means comprises lugs extending from said control plate means;

said second frictional force generating means comprises apertures disposed in said first hub disc;

said lugs of said control plate means are disposed within said apertures in said first hub disc with play; and said idle spring elements are disposed in depressions in said first hub disc.

16. The friction clutch according to claim 12, wherein:

said clutch disc comprises means for non-rotationally connecting said spring element to said input part;

said non-rotational connecting means comprises a plurality of lugs extending from said spring element;

said non-rotational connecting means comprises a plurality of apertures disposed in said input part; and said plurality of lugs of said spring element are disposed within said plurality of apertures in said input part.

17. The friction clutch according to claim 13, wherein:

said transmission comprises a transmission for a motor vehicle;

said axial movement and non-rotational engagement means comprises said plurality of apertures disposed in said output part and said plurality of lugs disposed on said inner portion of said friction ring;

said hub means comprises a hub disc comprising openings disposed therein;

said friction means comprises additional control plate means disposed axially opposite said control plate means with respect to said hub disc;

said clutch disc comprises means for non-rotationally connecting said control plate means to said additional control plate means;

said means for non-rotationally connecting said control plate means comprises lugs extending axially from said additional control plate means, said lugs extend through said openings in said hub disc and are engaged in openings in said control plate means;

said output part comprises a cover plate;

said additional control plate means is disposed to axially contact said cover plate; and said contact between said additional control plate means and said cover plate comprises a metal-to-metal contact.

18. A friction clutch for a transmission, said friction clutch comprising a clutch disc, said clutch disc comprising:

hub means;

said hub means having an axis of rotation;

said clutch disc having an axial direction substantially parallel to the axis of rotation;

an output part being disposed on said hub means;

an input part being rotationally disposed on said hub means;

friction lining means being disposed on said input part;

friction means for generating a frictional force between said input part and said output part;

said friction means comprising friction element means;

means for permitting said friction element means to move axially and to engage non-rotationally with one of said input part and said output part;

said friction element means being rotationally disposed to make frictional contact with the other of said input part and said output part;

said friction means comprising control plate means;

said control plate means being disposed to make frictional contact with said friction element means;

said axial and non-rotational engagement means connecting said friction element means to said input part;

said friction element means being rotationally disposed to make frictional contact with said output part; and said control plate means being disposed between said friction element means and said input part.

19. The friction clutch according to claim 18, wherein:

said friction means comprises means for biasing said control plate means toward said friction element means;

said means for biasing said control plate means is disposed substantially axially between said control plate means and said input part;

said means for biasing said control plate means comprises a spring element;

said spring element comprises a friction surface disposed between said spring element and one of:
  said input part; and
  said control plate means; and
said spring element is non-rotationally connected to the other one of:
  said input part; and
  said control plate means.

20. The friction clutch according to claim 19, wherein:
said clutch disc comprises means for non-rotationally connecting said spring element to said input part;
said friction element means comprises a friction ring;
said friction ring comprises an inner portion and an outer portion;
said outer portion of said friction ring is radially farther from the axis of rotation than said inner portion of said friction ring;
said axial movement and non-rotational engagement means comprises one of:
  a) a plurality of recesses disposed in said inner portion of said friction ring and a plurality of lugs extending from said input part and being disposed within said plurality of recesses; and
  b) a plurality of apertures disposed in said input part and a plurality of lugs disposed on said inner portion of said friction ring, said plurality of lugs extend substantially axially toward said input part and said plurality of lugs are disposed within corresponding ones of said plurality of apertures to drive said friction ring with said input part, and said spring element comprises a portion configured to surround at least one lug of said plurality of lugs to connectedly drive said spring element; and said transmission comprises a transmission for a motor vehicle.

* * * * *

UNITED STATES PATENT AND TRADEMARK OFFICE
CERTIFICATE OF CORRECTION

PATENT NO. : 5,673,778
DATED : October 7, 1997
INVENTOR(S) : Norbert AMENT

It is certified that error appears in the above-identified patent and that said Letters Patent is hereby corrected as shown below:

In column 1, line 31, after 'only', delete "be" and insert --by--.

In column 2, line 1, before 'to', delete "state" and insert --stage--.

In column 9, line 35, after 'first', delete "state" and insert --stage--.

In column 10, line 23, after the first occurrence of 'the', delete "war" and insert --wear--.

In column 13, line 27, after 'namely', delete "be" and insert --by--.

In column 16, line 44, after 'which', delete "exstend" and insert --extend--.

UNITED STATES PATENT AND TRADEMARK OFFICE
CERTIFICATE OF CORRECTION

PATENT NO. : 5,673,778
DATED : October 7, 1997
INVENTOR(S) : Norbert AMENT

It is certified that error appears in the above-identified patent and that said Letters Patent is hereby corrected as shown below:

In column 18, line 36, after 'lugs' insert --19--.

In column 18, line 50, after 'friction', delete "drive," and insert --device,--.

In column 21, line 6, after 'rotates', delete "the" and insert --and--.

In column 21, line 43, after 'at', delete "leasat" and insert --least--.

In column 24, line 48, before 'to', delete "4,249,660" and insert --5,249,660--.

UNITED STATES PATENT AND TRADEMARK OFFICE
CERTIFICATE OF CORRECTION

PATENT NO. : 5,673,778
DATED : October 7, 1997
INVENTOR(S) : Norbert AMENT

It is certified that error appears in the above-identified patent and that said Letters Patent is hereby corrected as shown below:

In column 24, line 48, after 'and', delete "Jeepe," and insert --Jeppe,--.

In column 27, line 43, Claim 6, before 'additional', delete "aid" and insert --said--.

In column 27, line 62, Claim 7, after 'to', delete "on" and insert --one--.

In column 30, line 1, Claim 13, after the first occurrence of 'said', delete "input" and insert --output--.

In column 31, line 15, Claim 15, after 'means;' delete "and".

UNITED STATES PATENT AND TRADEMARK OFFICE
CERTIFICATE OF CORRECTION

PATENT NO. : 5,673,778
DATED : October 7, 1997
INVENTOR(S) : Norbert AMENT

It is certified that error appears in the above-identified patent and that said Letters Patent is hereby corrected as shown below:

In column 31, line 61, Claim 16, after the second occurrence of 'said', delete "input" and insert --output--.

In column 31, line 65, Claim 16, after 'said', delete "input" and insert --output--.

In column 31, line 67, Claim 16, after the second occurrence of 'said', delete "input" and insert --output--.

Signed and Sealed this

Twenty-eighth Day of July, 1998

*Attest:*

BRUCE LEHMAN

*Attesting Officer*     Commissioner of Patents and Trademarks